(12) United States Patent
Kim et al.

(10) Patent No.: US 10,616,913 B2
(45) Date of Patent: Apr. 7, 2020

(54) METHOD FOR SUPPORTING MULTIPLE SCHEDULING REQUESTS IN NEXT-GENERATION MOBILE COMMUNICATION SYSTEM

(71) Applicant: Samsung Electronics Co., Ltd., Suwon-si, Gyeonggi-do (KR)

(72) Inventors: Soenghun Kim, Suwon-si (KR); Donggun Kim, Seoul (KR); Jaehyuk Jang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/010,029

(22) Filed: Jun. 15, 2018

(65) Prior Publication Data
US 2018/0368167 A1    Dec. 20, 2018

(30) Foreign Application Priority Data
Jun. 16, 2017    (KR) .................. 10-2017-0076361

(51) Int. Cl.
*H04W 72/12* (2009.01)
*H04W 74/08* (2009.01)
*H04W 72/04* (2009.01)

(52) U.S. Cl.
CPC ... *H04W 72/1284* (2013.01); *H04W 72/0446* (2013.01); *H04W 74/0833* (2013.01); *H04W 72/1242* (2013.01)

(58) Field of Classification Search
None
See application file for complete search history.

(56) References Cited

U.S. PATENT DOCUMENTS 10,374,916 B2 *   8/2019  Yi .................... H04L 43/065
2012/0093106 A1   4/2012  Dong
(Continued)

FOREIGN PATENT DOCUMENTS

EP          2802187 A1    11/2014
KR    10-2018-055662 A     5/2018

OTHER PUBLICATIONS

International Search Report dated Sep. 14, 2018 in connection with International Patent Application No. PCT/KR2018/006810, 3 pages.
(Continued)

*Primary Examiner* — Eunsook Choi

(57) ABSTRACT

The present disclosure relates to a communication method and system for converging a 5G communication system for supporting higher data rates beyond a 4G system with a technology for Internet of Things (IoT). The present disclosure may be applied to intelligent services based on the 5G and IoT-related technologies, such as smart home, smart building, smart city, smart car, connected car, health care, digital education, smart retail, security and safety services. The present disclosure provides methods and apparatus for scheduling transmission resources between a user equipment and a base station. A method includes detecting a buffer status report (BSR) triggering event based on a BSR retransmission timer, identifying a highest priority logical channel (LCH) having data available for transmission in response to the detected event, identifying SR configuration information corresponding to the highest priority LCH and transmitting, to a base station, an SR based on the identified SR configuration information.

12 Claims, 26 Drawing Sheets

(56) References Cited

U.S. PATENT DOCUMENTS

| | | | |
|---|---|---|---|
| 2014/0301312 A1* | 10/2014 | Kim | H04W 72/1263 370/329 |
| 2015/0043547 A1 | 2/2015 | Pelletier et al. | |
| 2016/0330752 A1* | 11/2016 | Kato | H04W 16/32 |
| 2018/0041410 A1* | 2/2018 | Yi | H04L 43/065 |
| 2018/0139030 A1 | 5/2018 | Kim et al. | |

OTHER PUBLICATIONS

Huawei, HiSilicon, "SR enhancements with multiple numerologies", 3GPP TSG-RAN2 Meeting #98, May 15-19, 2017, 4 pages, R2-1705625.

Samsung, "BSR for Multiple Numerology Operation", 3GPP TSG-RAN WG2 NR#98, May 15-19, 2017, 3 pages, R2-1705057.

Huawei, HiSilicon, "Enhancements for SR and BSR", 3GPP TSG-RAN WG2 #97bis, 5 pages, R2-1702603.

European Patent Office, "Supplementary European Search Report," Application No. EP18817693.7, dated Jan. 7, 2020, 9 pages.

Intel Corporation, "Enhancement of SR/BSR," R2-1704784, 3GPP TSG RAN WG2 Meeting #98, Hangzhou, China, May 15-19, 2017, 5 pages.

\* cited by examiner

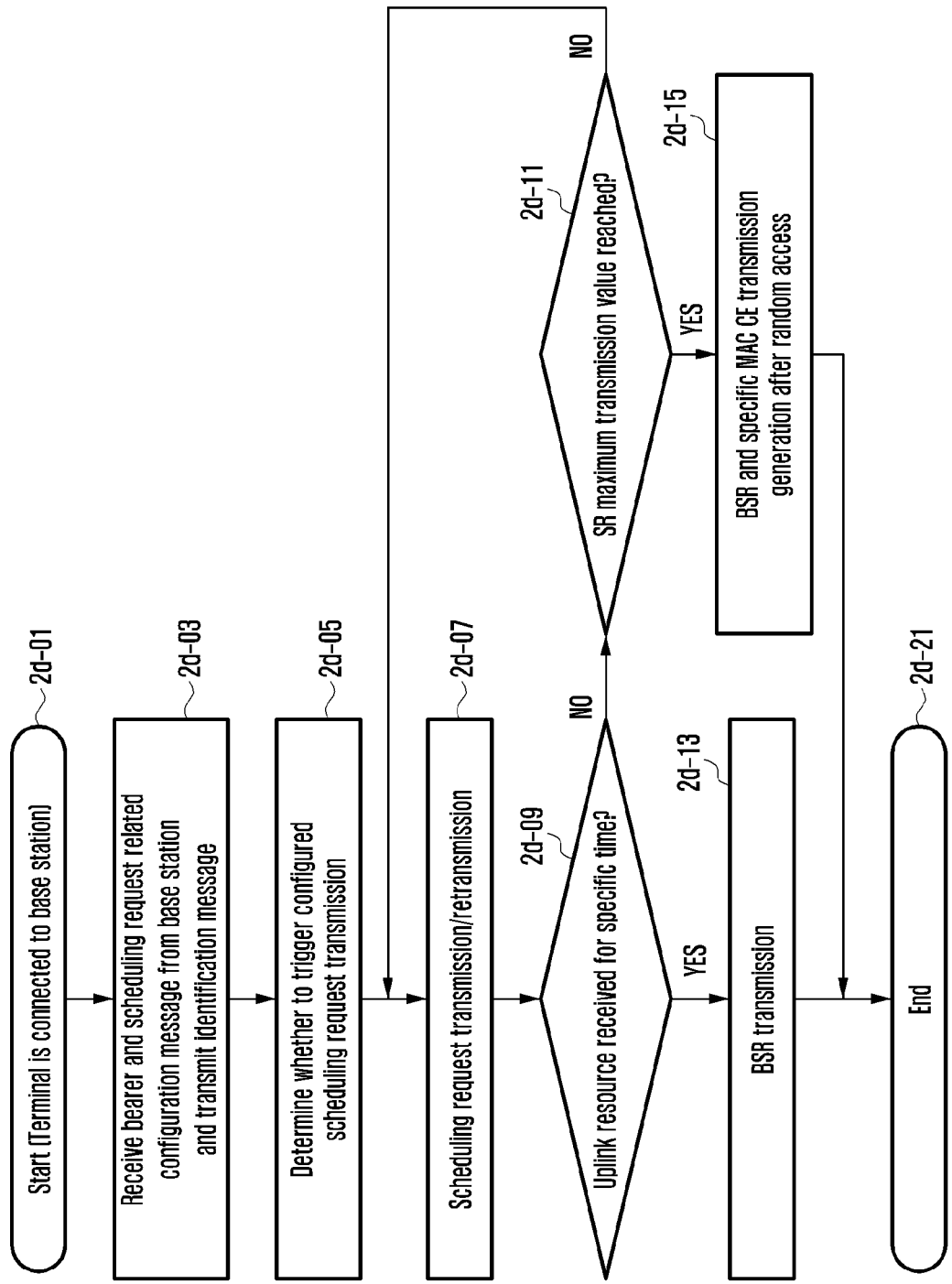

METHOD FOR SUPPORTING MULTIPLE SCHEDULING REQUESTS IN NEXT-GENERATION MOBILE COMMUNICATION SYSTEM

CROSS-REFERENCE TO RELATED APPLICATION AND CLAIM OF PRIORITY

This application is based on and claims priority under 35 U.S.C. § 119 to Korean Patent Application No. 10-2017-0076361 filed on Jun. 16, 2017, in the Korean Intellectual Property Office, the disclosure of which is incorporated by reference herein in its entirety.

BACKGROUND

1. Field

The present disclosure relates to a method by a terminal for requesting transmission resources to transmit data in a wireless communication system.

2. Description of the Related Art

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System.' The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like. In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology," "wired/wireless communication and network infrastructure," "service interface technology," and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 5G technology and the IoT technology.

Further, there has been a need for various methods for transmitting a scheduling request in a 5G communication system.

SUMMARY

The present disclosure provides a method for configuring a flow-based quality of service (QoS) rather than a bearer-based QoS, and a method for configuring a new service data association protocol (SDAP) layer and a packet data convergence protocol (PDCP) layer and an SDAP layer for supporting the SDAP layer on a PDCP layer in order to process the flow-based QoS.

Further, the present disclosure provides a method for enabling a plurality of scheduling request resources if a base station configures the plurality of scheduling request resources in order for the terminal to perform a transmission resource request for transmitting data in a wireless communication system.

In accordance with one aspect of the present disclosure, a method for transmitting a scheduling request (SR) by a terminal in a wireless communication system, the method comprising, detecting a buffer status report (BSR) triggering event based on a BSR retransmission timer, identifying a highest priority logical channel (LCH) having data available for transmission in response to the detected event, identifying scheduling request (SR) configuration information corresponding to the highest priority LCH and transmitting, to a base station, an SR based on the identified SR configuration information.

In accordance with another aspect of the present disclosure, a terminal for transmitting a scheduling request (SR) in a wireless communication system, comprising a transceiver and a controller coupled with the transceiver and configured to detect a buffer status report (BSR) triggering event based on a BSR retransmission timer, identify a highest priority logical channel (LCH) having data available for transmission in response to the detected event, identify scheduling request (SR) configuration information corresponding to the highest priority LCH, and control the transceiver to transmit, to a base station, an SR based on the identified SR configuration information.

In accordance with still another aspect of the present disclosure, a method for receiving a scheduling request (SR) by a base station in a wireless communication system, the method comprising transmitting to a terminal a message including scheduling request (SR) configuration information and receiving a SR based on the SR configuration information, wherein, a buffer status report (BSR) triggering event is detected based on a BSR retransmission timer, a highest priority logical channel (LCH) having data available for transmission in response to the detected event is identified, and the SR configuration information corresponding to the highest priority LCH is identified by the terminal.

In accordance with yet still another aspect of the present disclosure, a base station for receiving a scheduling request (SR) in a wireless communication system, comprising a transceiver and a controller coupled with the transceiver and configured to control the transceiver to transmit to a terminal a message including scheduling request (SR) configuration information, and receive an SR based on the SR configuration information, wherein, a buffer status report (BSR) triggering event is detected based on a BSR retransmission timer, a highest priority logical channel (LCH) having data available for transmission in response to the detected event is identified, and the SR configuration information corresponding to the highest priority LCH is identified by the terminal.

According to aspects of the present disclosure, methods for configuring the flow-based QoS rather than the bearer-based QoS is introduced, and the new SDAP layer on the PDCP layer to process the flow-based QoS are provided. Further, the methods for configuring the PDCP layer and the SDAP layer for supporting this are proposed to efficiently process the flow-based QoS.

Further, according to another embodiment of the present disclosure, the terminal is able to be allocated with an uplink resource in a timely manner and transmit data through performing of a resource request using a plurality of scheduling requests in accordance with the traffic characteristics and the cause of the transmission resource requests.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 2D is an exemplary diagram illustrating the 2-1 embodiment for an operation order of a terminal when a method for transmitting a scheduling request is used according to one embodiment of the present disclosure;

DETAILED DESCRIPTION

Figure 1A:
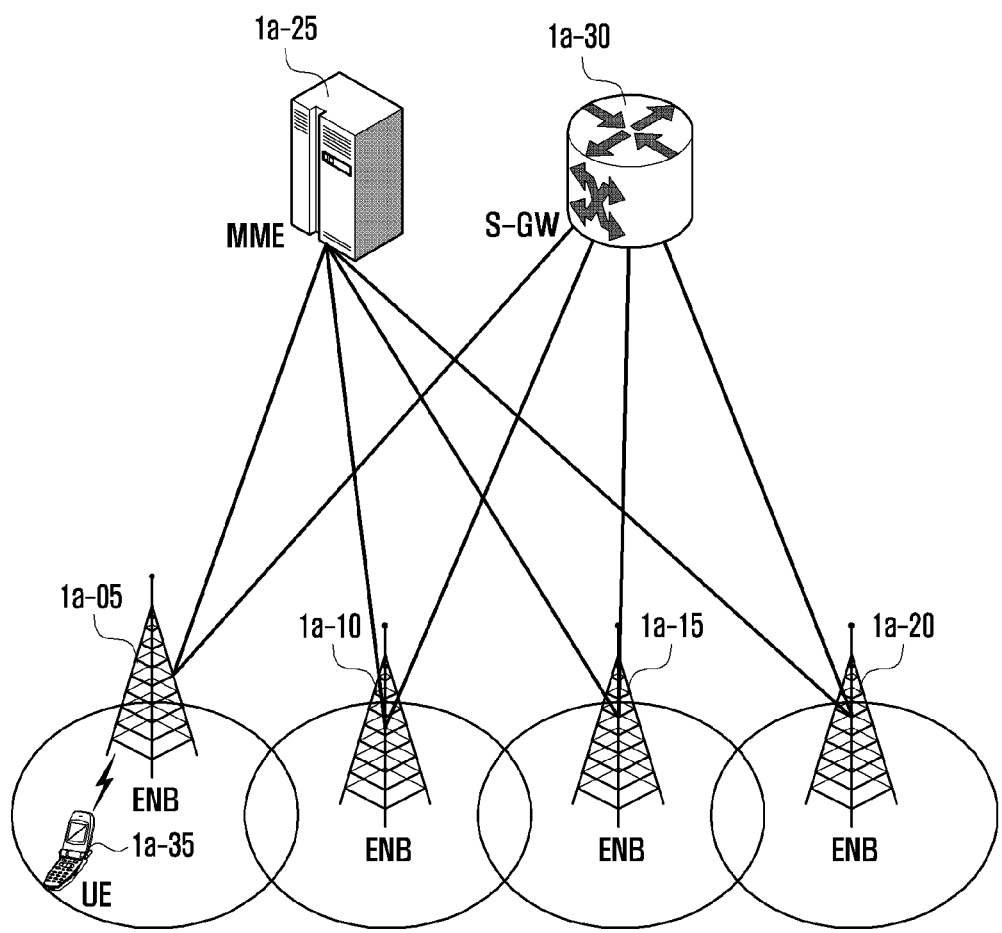
FIG. 1A is an exemplary diagram illustrating the structure of an LTE system on which embodiments of the present disclosure are implemented.
Figure 1B:
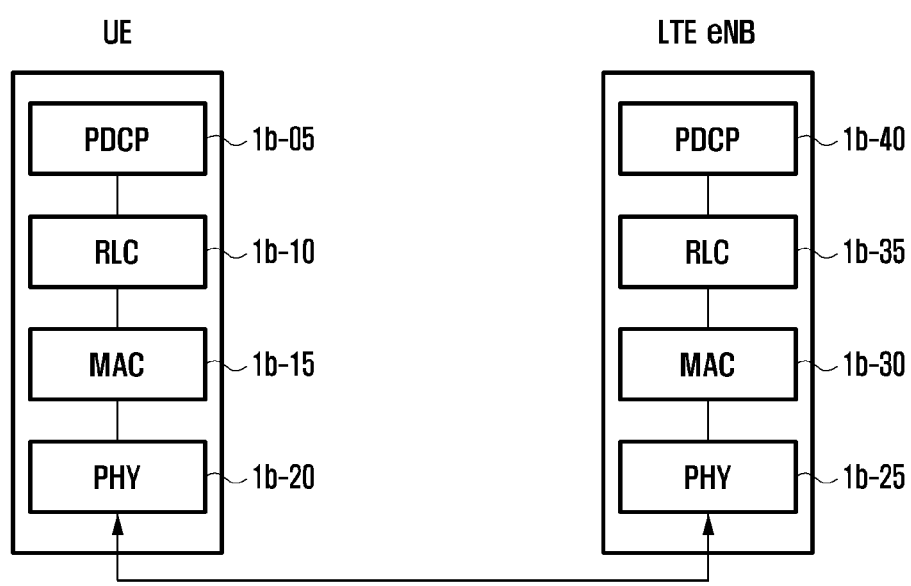
FIG. 1B is an exemplary diagram illustrating a radio protocol structure in an LTE system on which embodiments of the present disclosure are implemented.
Figure 1C:
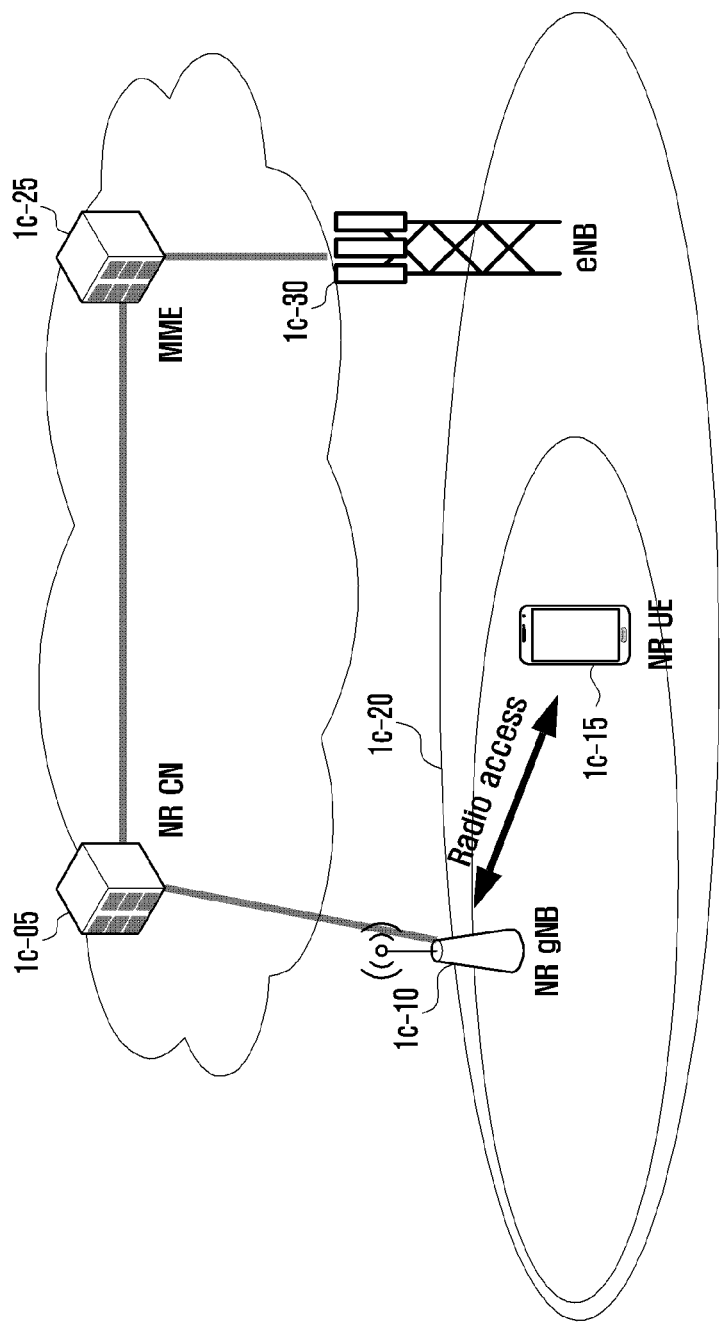
FIG. 1C is an exemplary diagram illustrating the structure of a next-generation mobile communication system on which embodiments of the present disclosure are implemented.
Figure 1D:
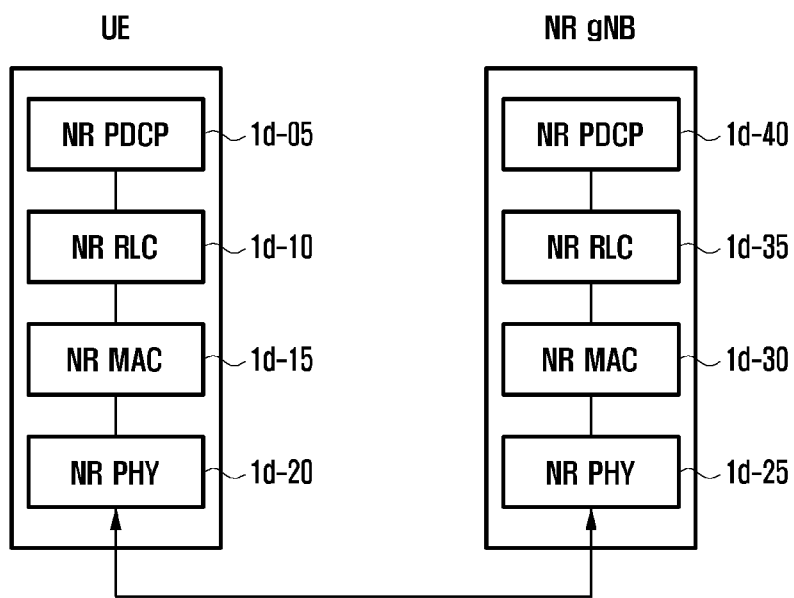
FIG. 1D is an exemplary diagram illustrating a radio protocol structure of a next-generation mobile communication system on which embodiments of the present disclosure are implemented.
Figure 1E:
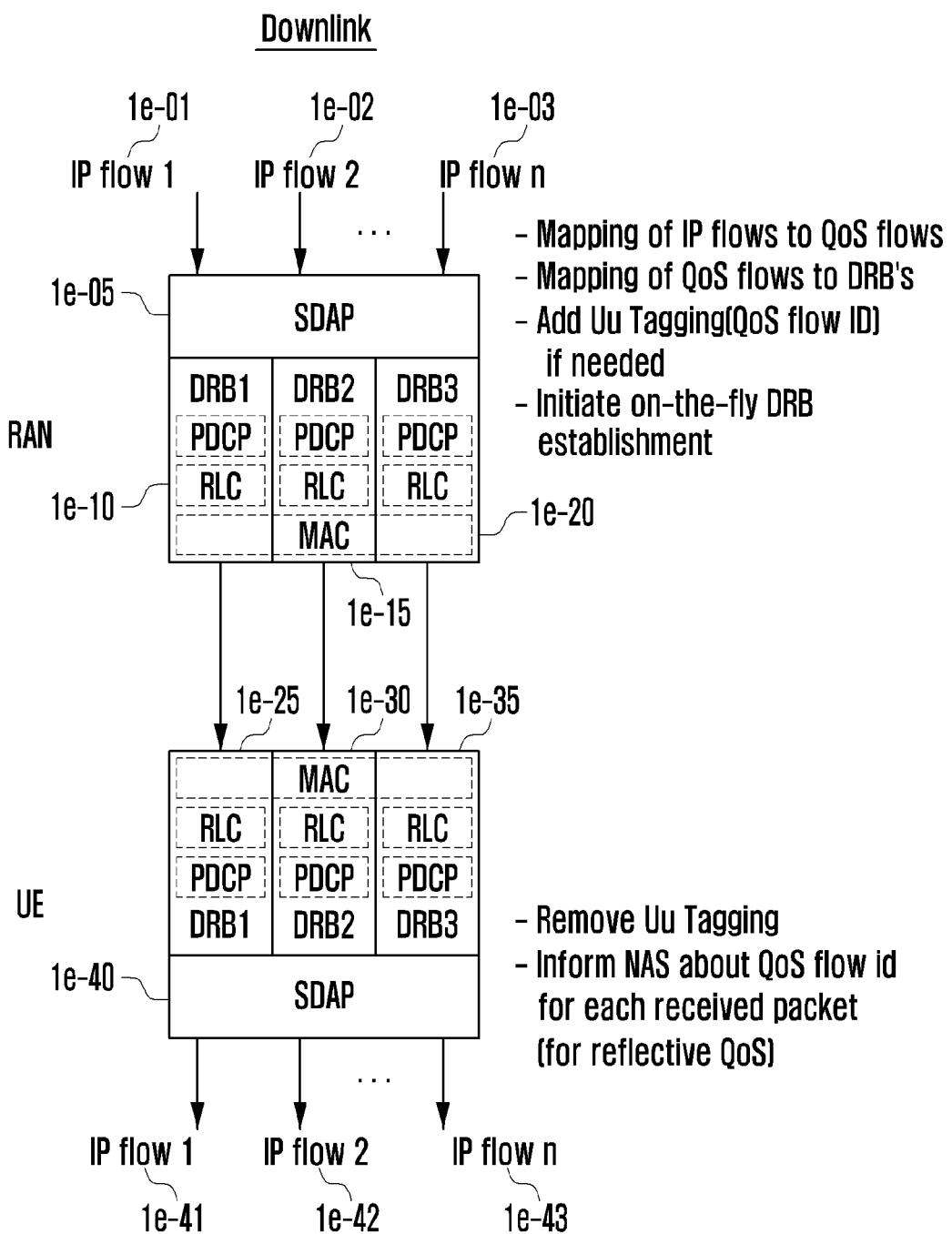
FIGS. 1EA through 1EC are exemplary diagrams illustrating new layers and functions for handling a QoS in a next-generation system according to one embodiment of the present disclosure.
Figure 1E:
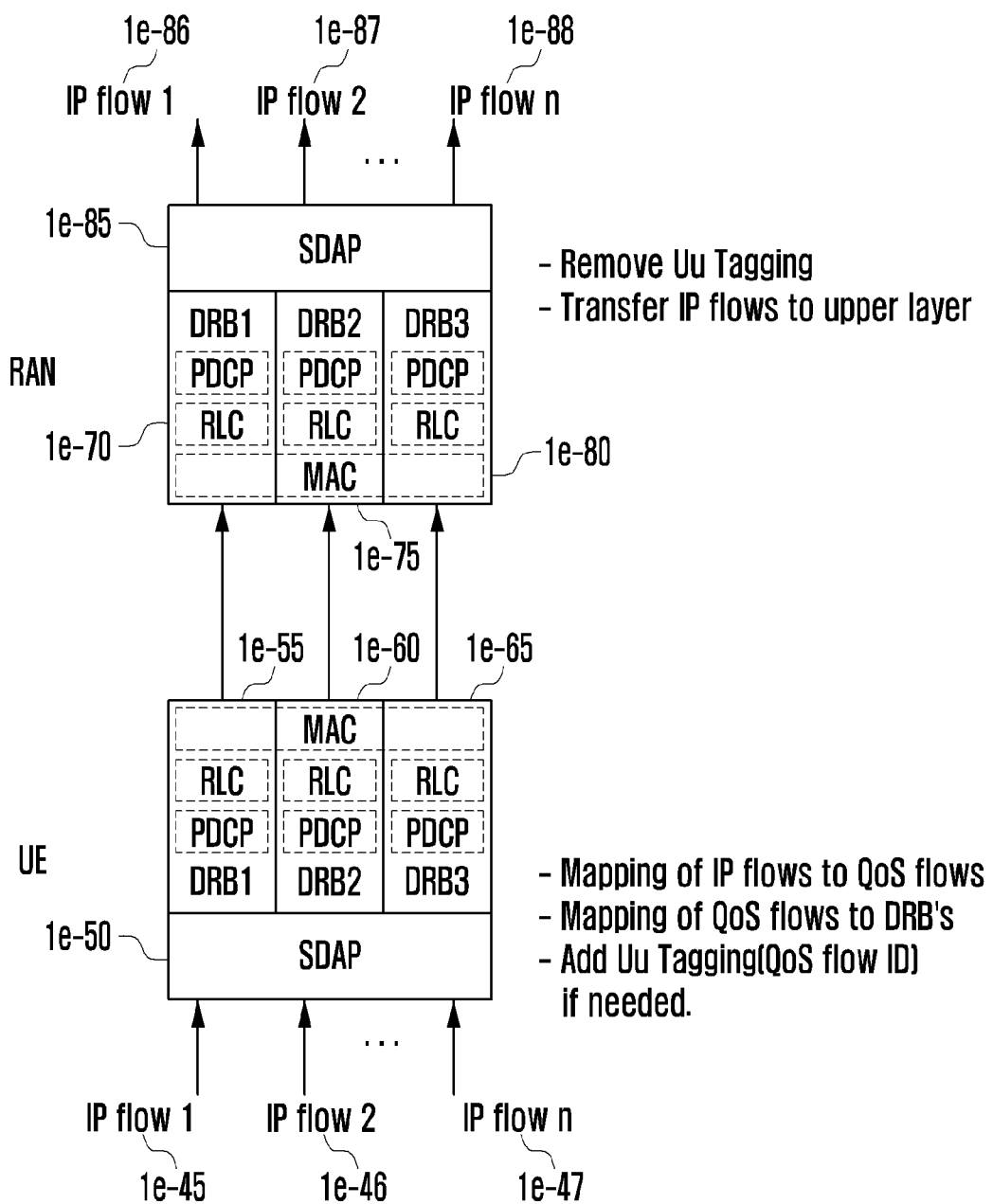
Figure 1E:
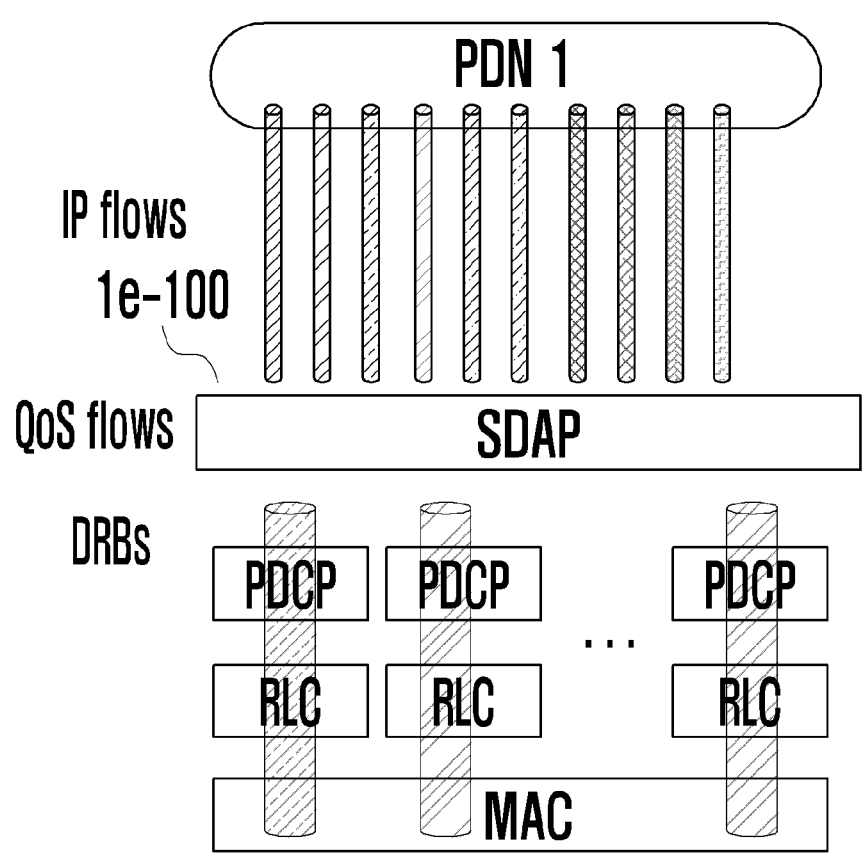
Figure 1F:
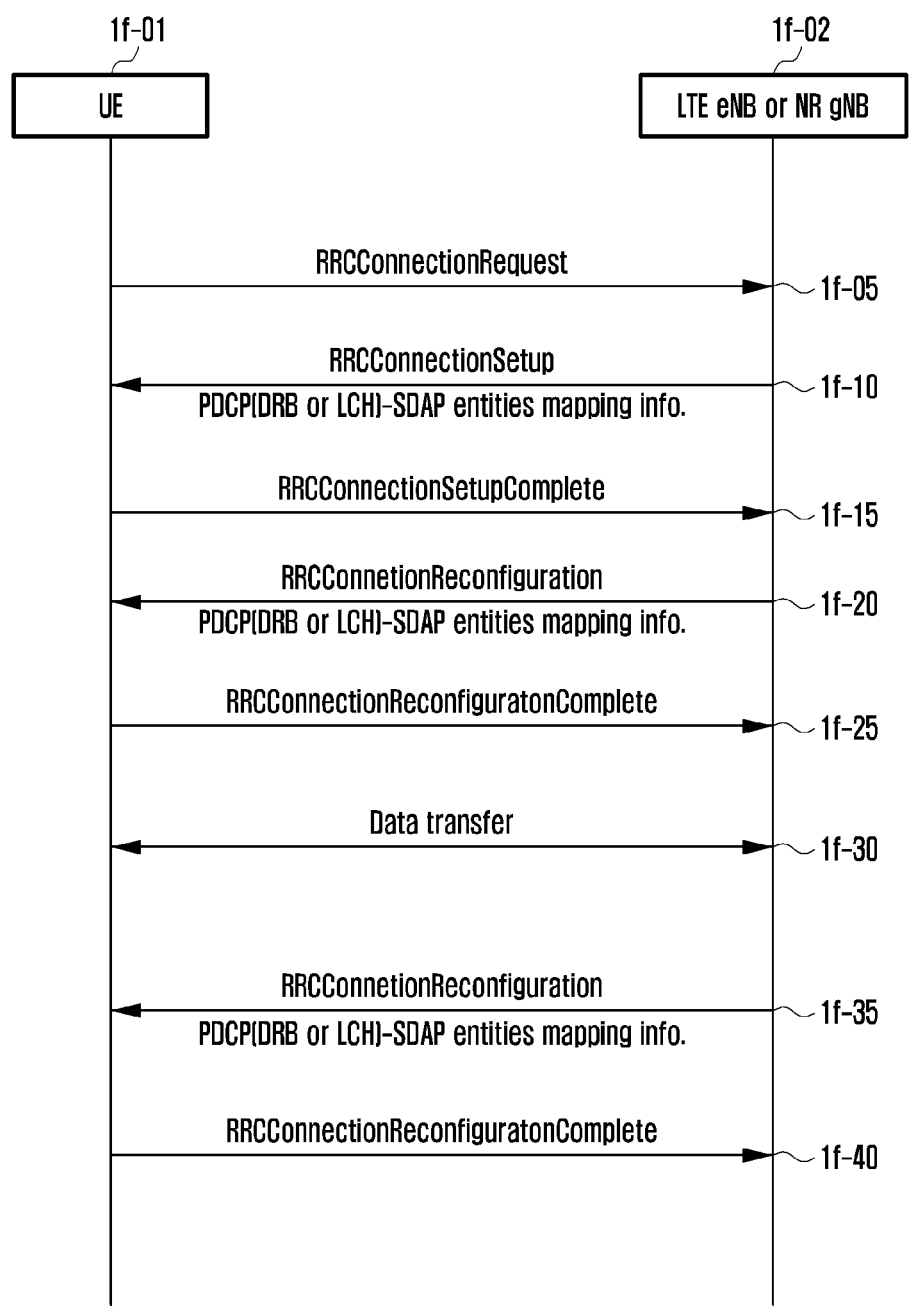
FIG. 1F is an exemplary diagram illustrating a procedure in which a base station configures respective layer entities (hereinafter, entities) and bearers through RRC signaling in a next-generation mobile communication system according to one embodiment of the present disclosure.
Figure 1G:
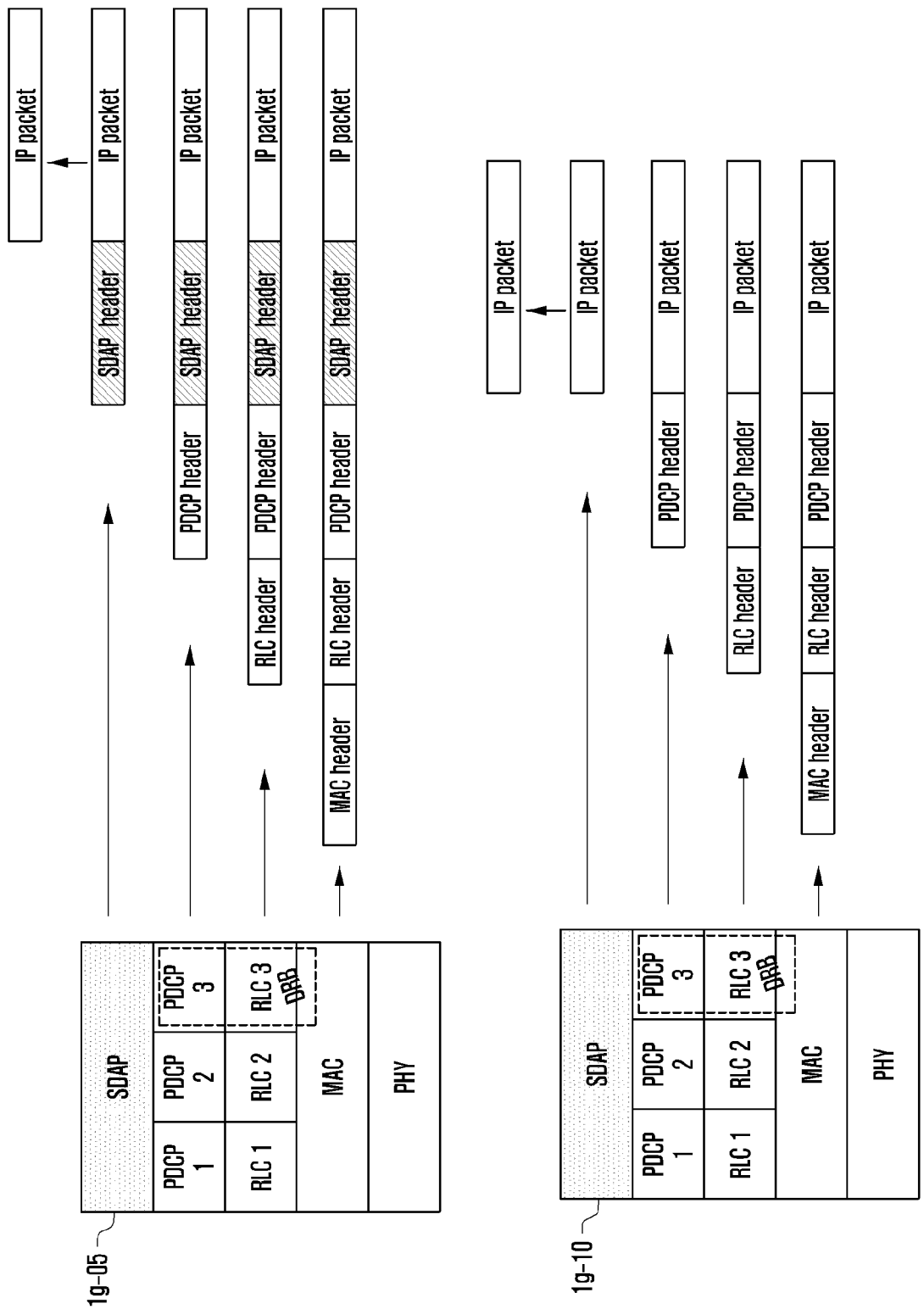
FIG. 1G is an exemplary diagram illustrating a header and data structure according to each layer according to one embodiment of the present disclosure.
Figure 1H:
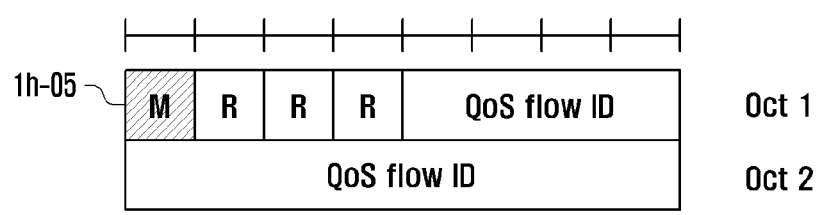
FIG. 1H is an exemplary diagram illustrating the 1-1 embodiment for processing a QoS for each IP flow in a next-generation mobile communication system according to one embodiment of the present disclosure.
Figure 1I:
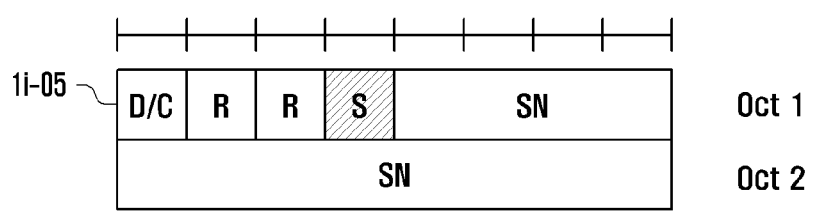
FIG. 1I is an exemplary diagram illustrating the 1-2 embodiment for processing a QoS for each IP flow in a next-generation mobile communication system according to one embodiment of the present disclosure.
Figure 1J:
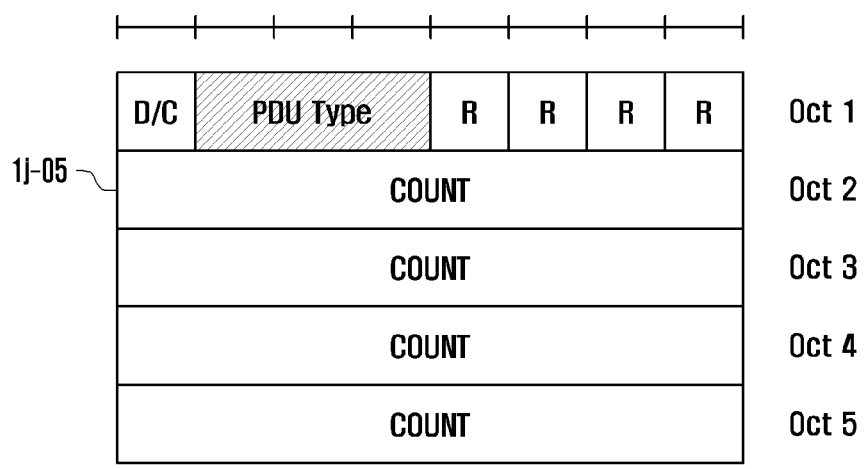
FIG. 1J is an exemplary diagram illustrating the 1-3 embodiment for processing a QoS for each IP flow in a next-generation mobile communication system according to one embodiment of the present disclosure.
Figure 1K:
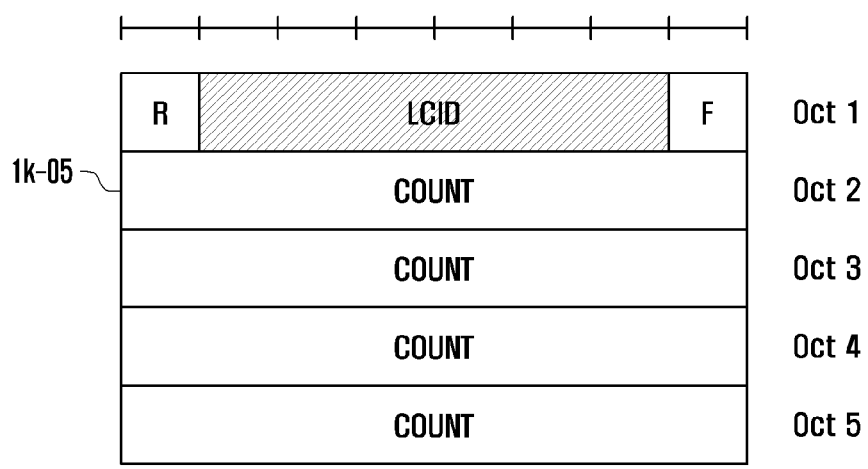
FIG. 1K is an exemplary diagram illustrating the 1-4 embodiment for processing a QoS for each IP flow in a next-generation mobile communication system according to the present disclosure.
Figure 1L:
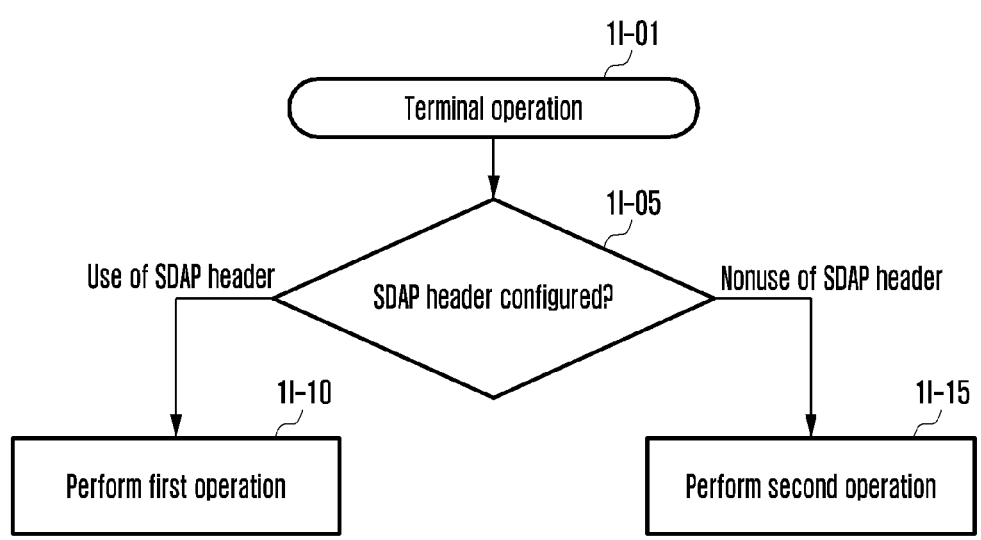
FIG. 1L is an exemplary diagram illustrating a terminal operation for processing a QoS for each IP flow in a next-generation mobile communication system according to one embodiment of the present disclosure.
Figure 1M:
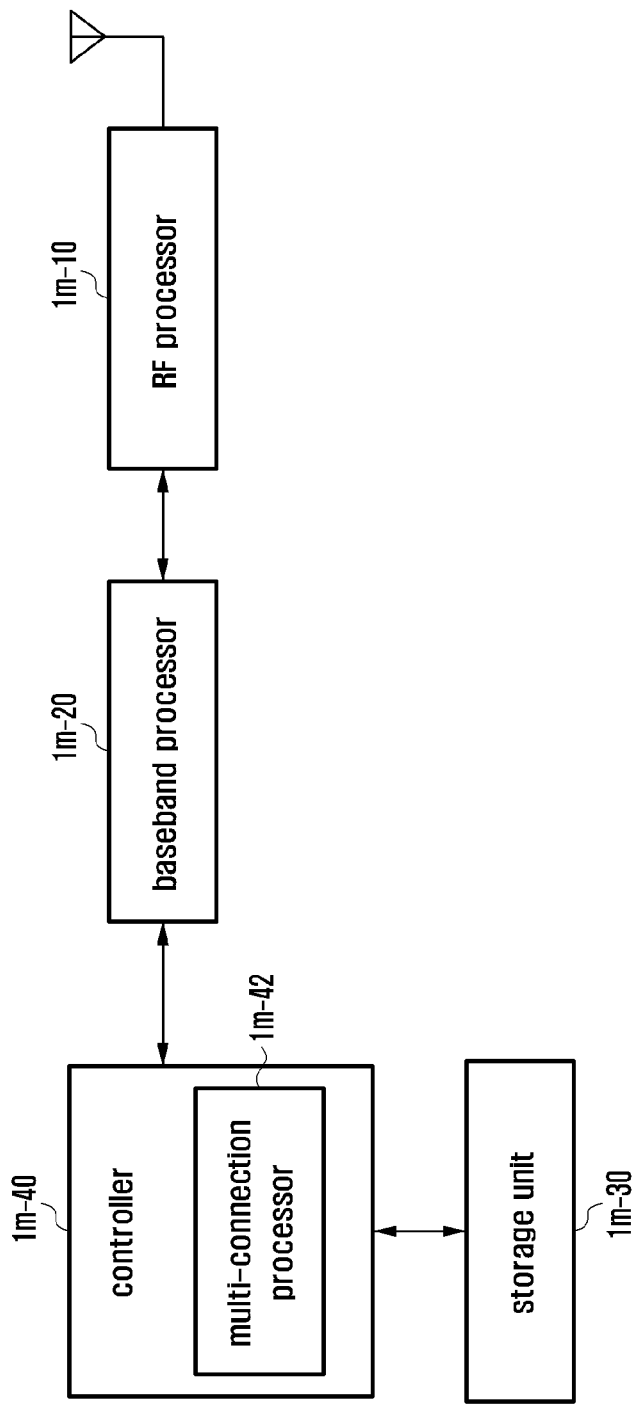
FIG. 1M is an exemplary diagram illustrating the structure of a terminal on which embodiments of the present disclosure are implemented.
Figure 1N:
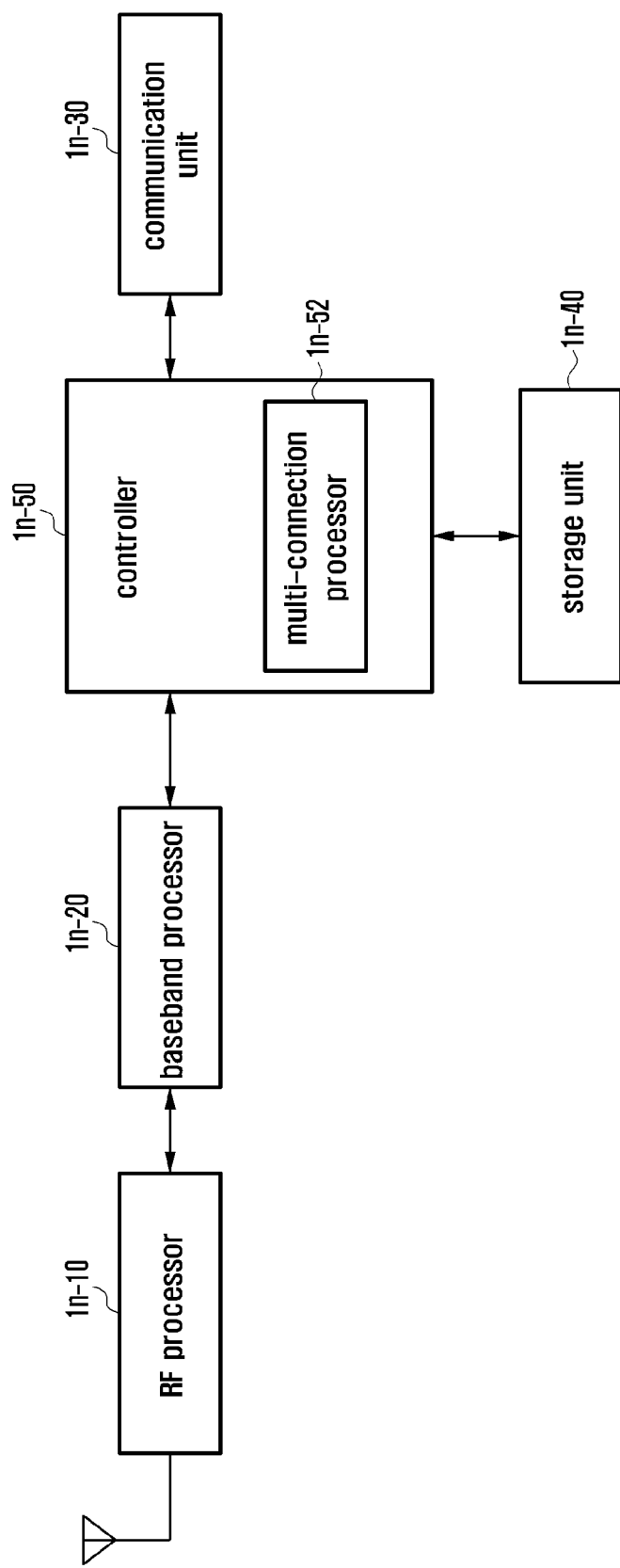
FIG. 1N is an exemplary diagram illustrating a block configuration of a TRP in a wireless communication system on which embodiments of the present disclosure are implemented.
Figure 2A:
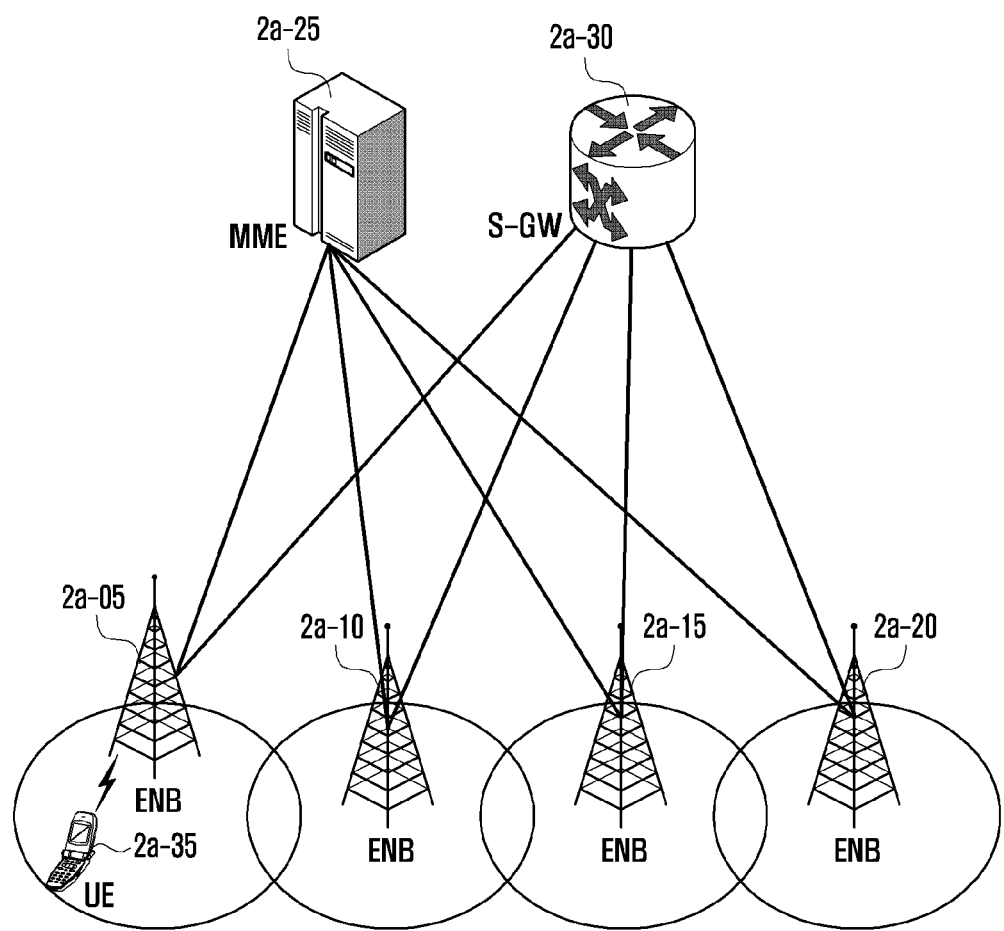
FIG. 2A is an exemplary diagram illustrating the structure of an LTE system on which embodiments of the present disclosure are implemented.
Figure 2B:
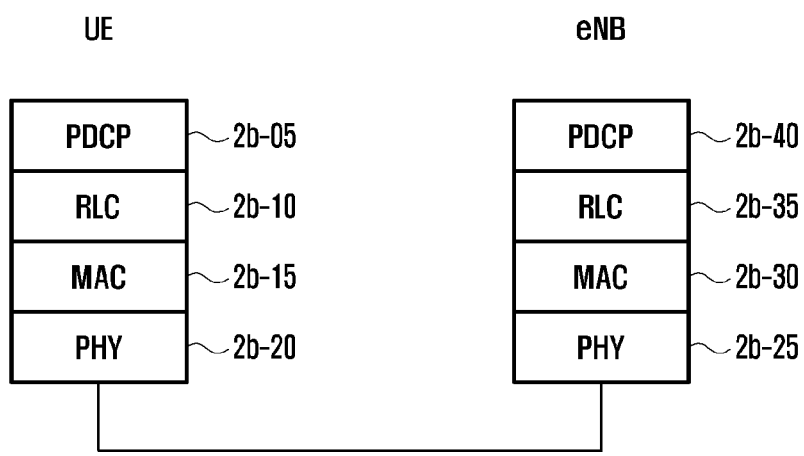
FIG. 2B is an exemplary diagram illustrating a radio protocol structure of an LTE system on which embodiments of the present disclosure are implemented.
Figure 2C:
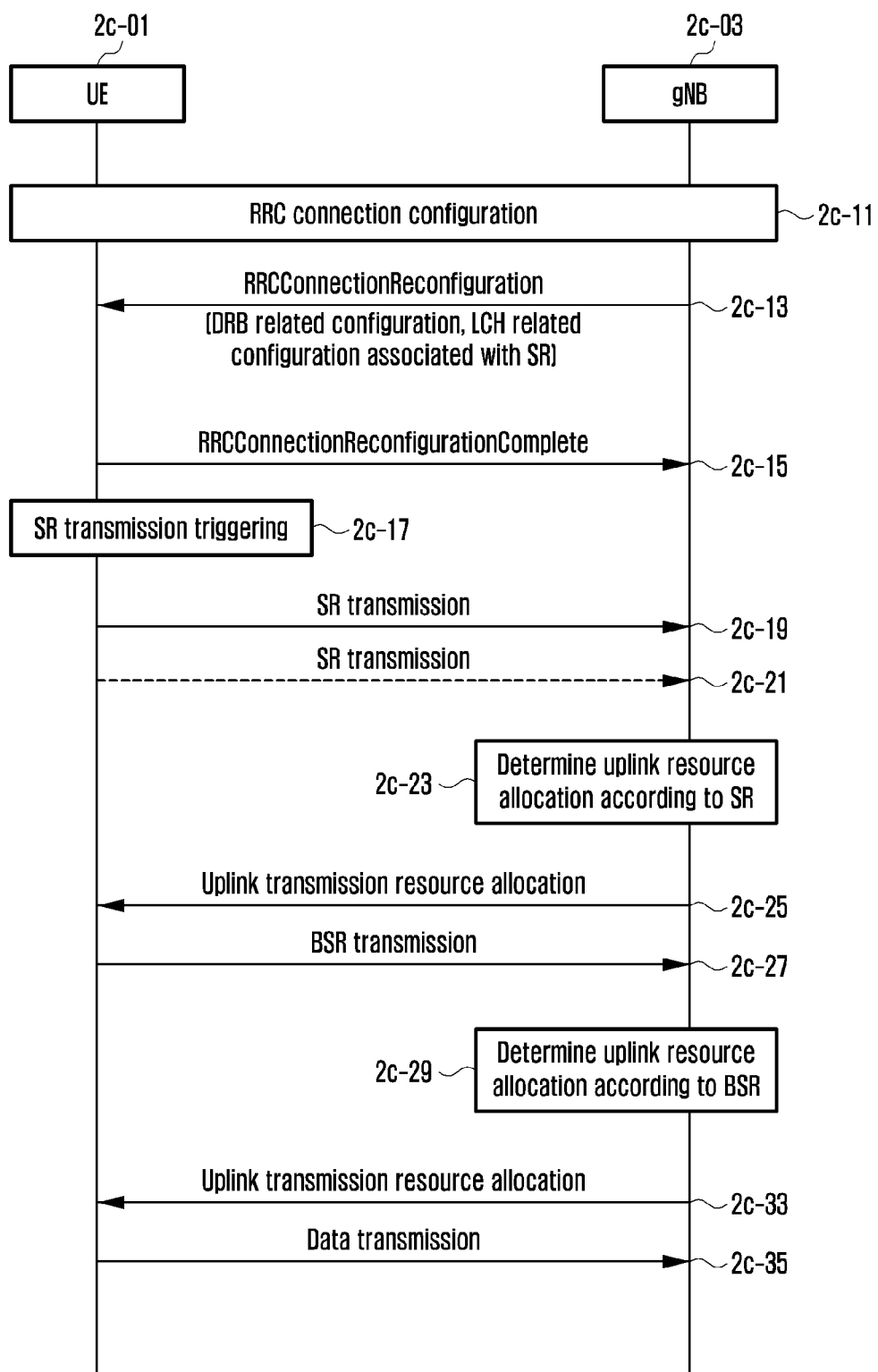
FIG. 2C is an exemplary diagram illustrating the 2-1 embodiment for a message flow between a terminal and a base station when a method for transmitting a scheduling request is used according to one embodiment of the present disclosure.
Figure 2E:
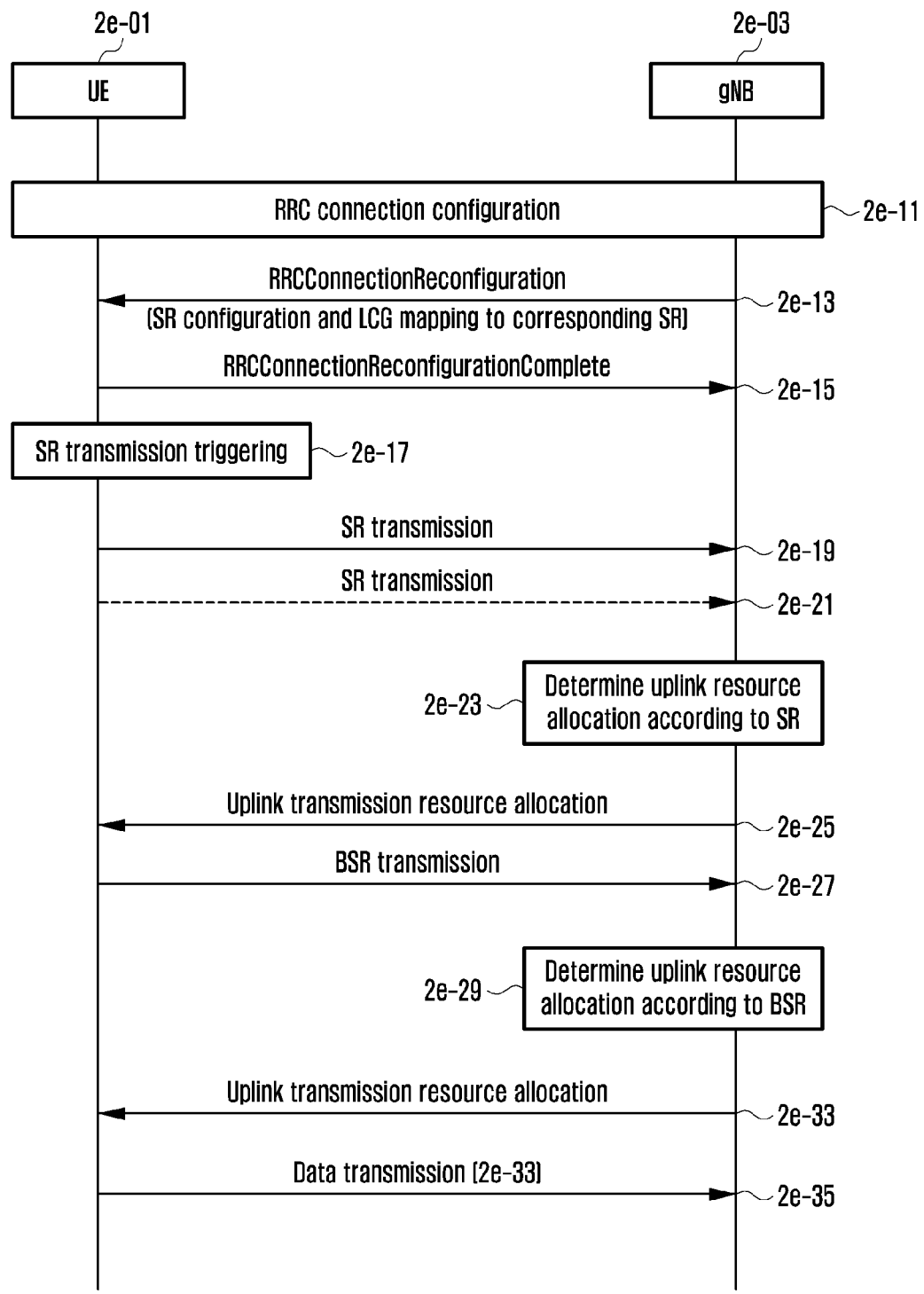
FIG. 2E is an exemplary diagram illustrating the 2-2 embodiment for a message flow between a terminal and a base station when a method for transmitting a scheduling request is used according to one embodiment of the present disclosure.
Figure 2F:
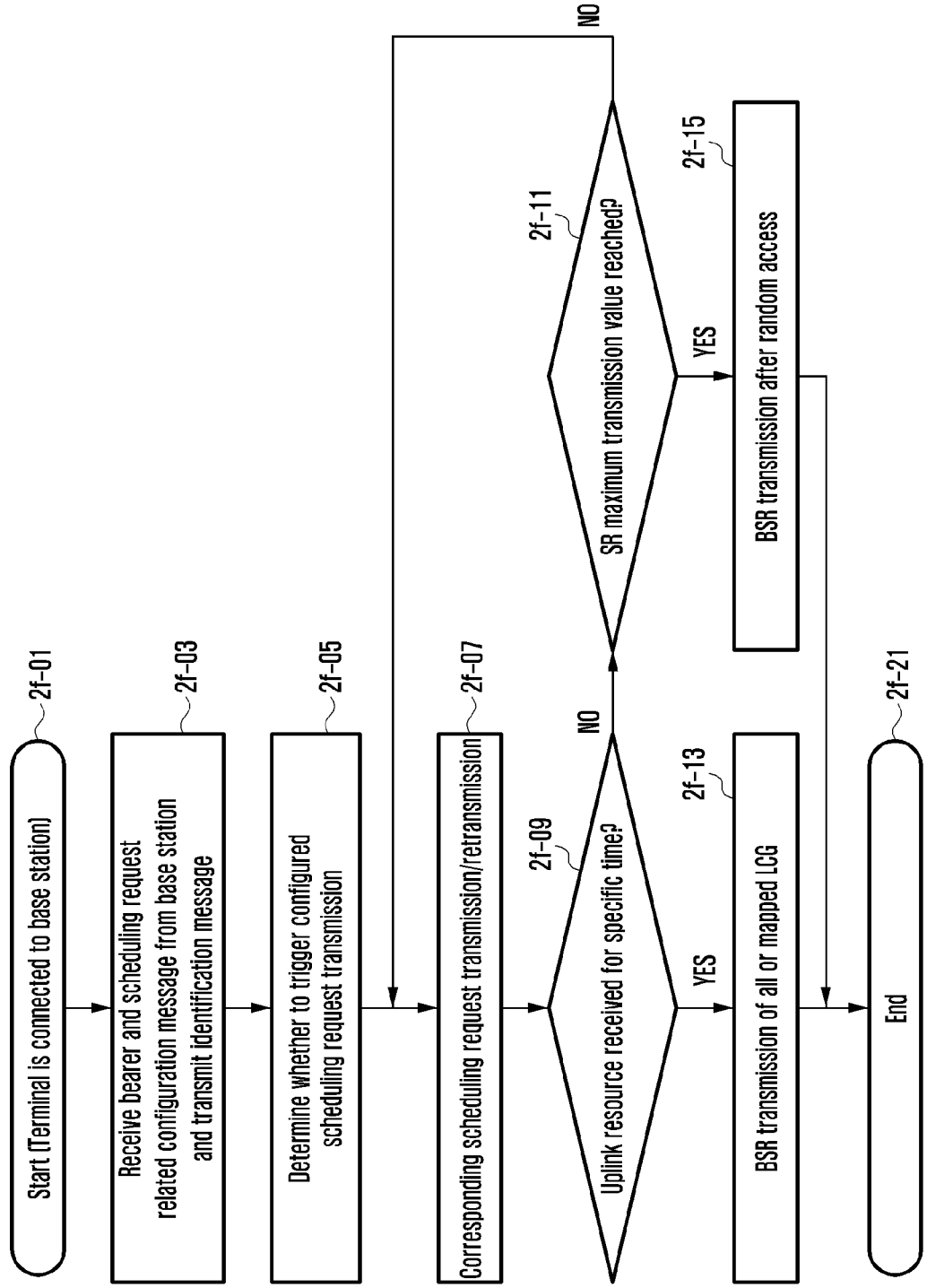
FIG. 2F is an exemplary diagram illustrating the 2-2 embodiment for an operation order of a terminal when a method for transmitting a scheduling request is used according to one embodiment of the present disclosure.
Figure 2G:
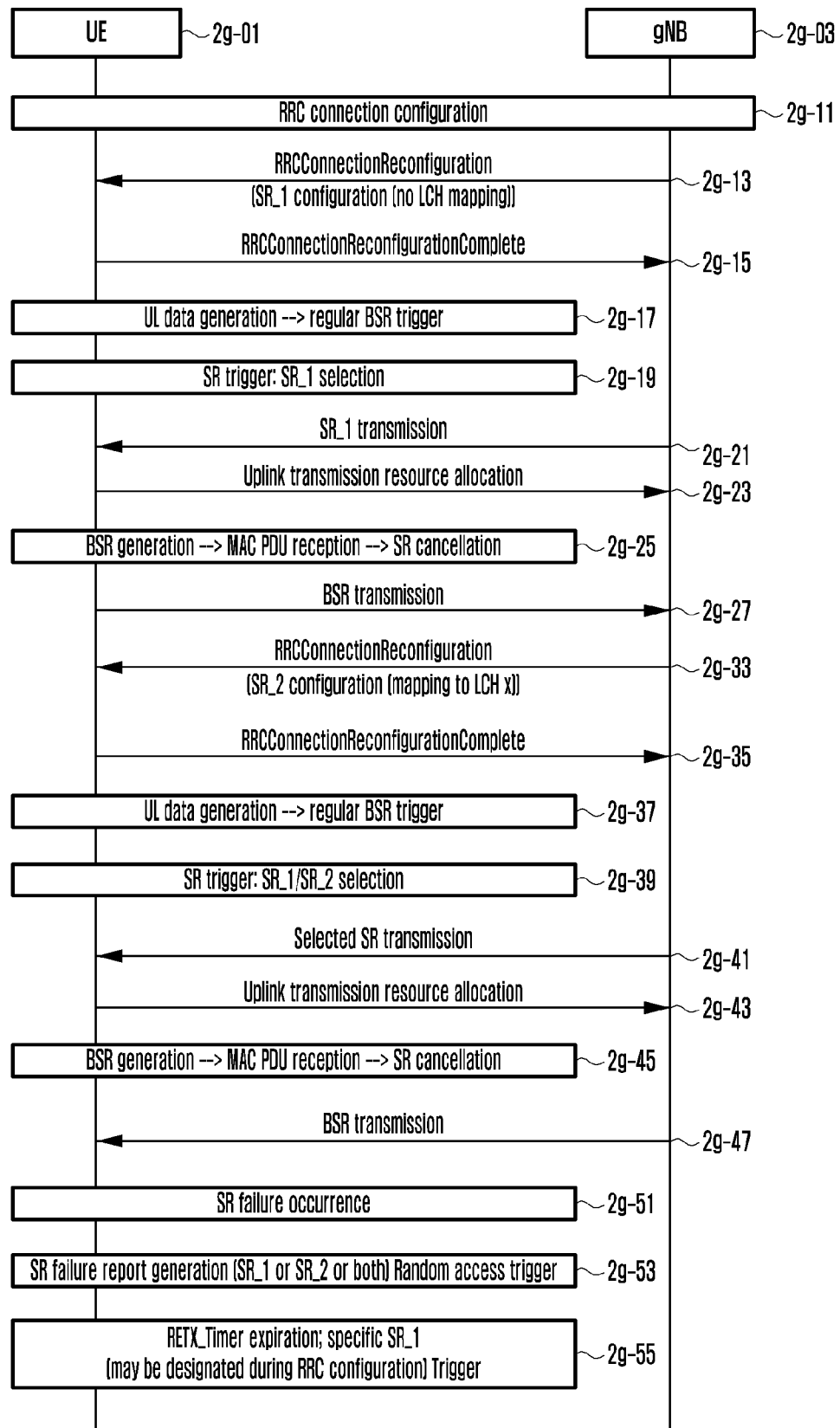
FIG. 2G is a diagram illustrating the 2-3 embodiment for a message flow between a terminal and a base station when a method for transmitting a scheduling request is used according to one embodiment of the present disclosure.
Figure 2H:
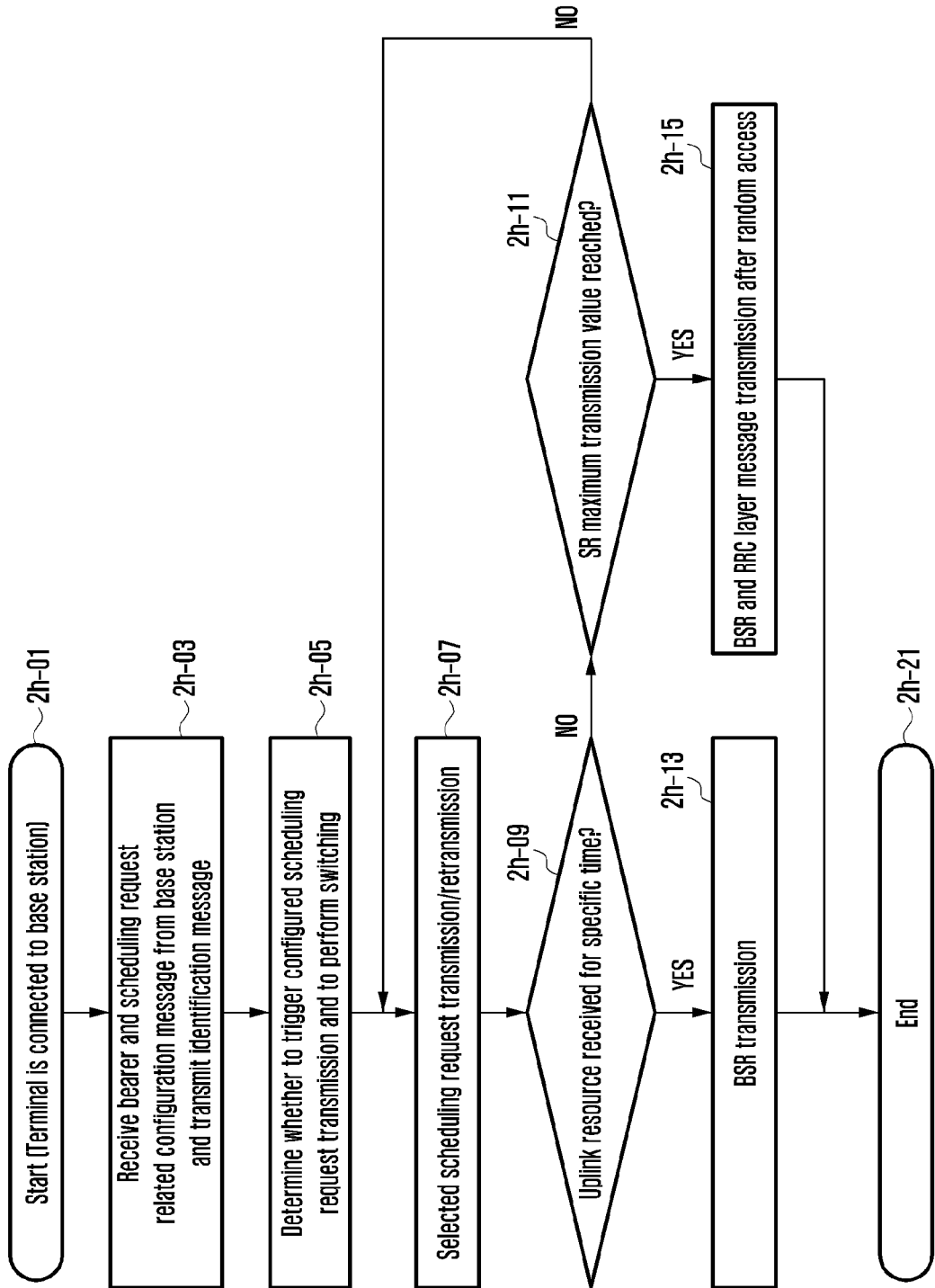
FIG. 2H is a diagram illustrating the 2-3 embodiment for an operation order of a terminal when a method for transmitting a scheduling request is used according to one embodiment of the present disclosure.
Figure 2I:
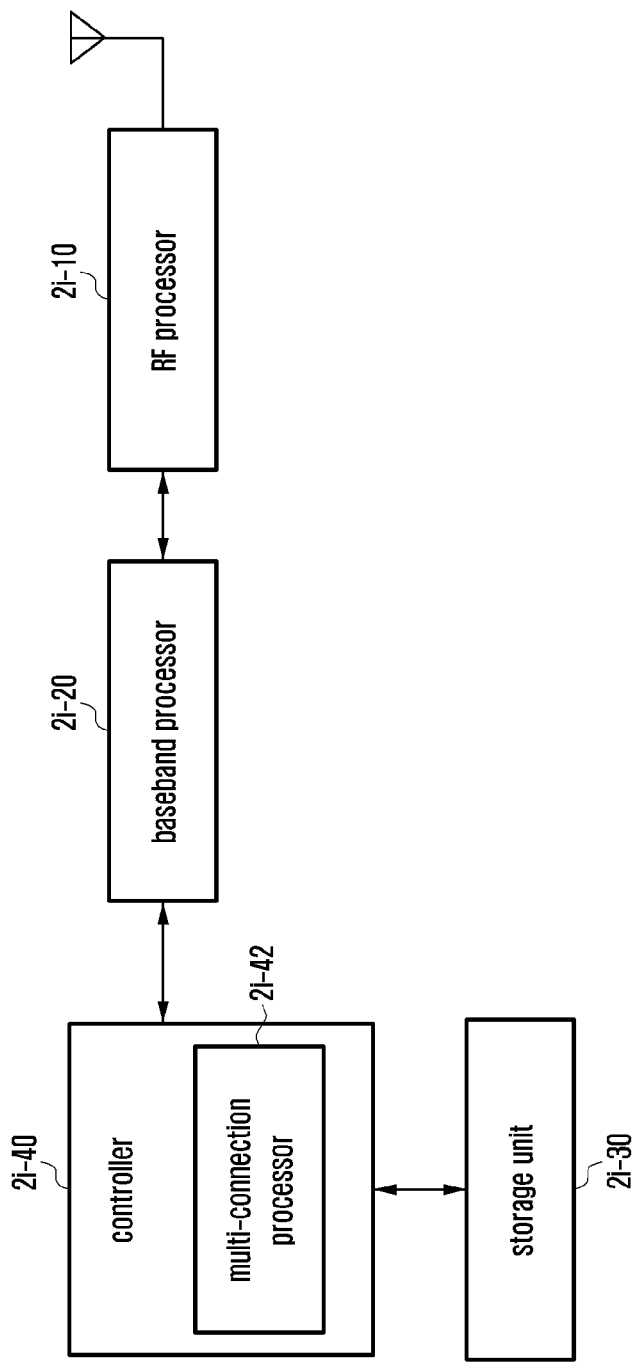
FIG. 2I is a diagram illustrating an example of a block configuration of a terminal according to an embodiment of the present disclosure.
Figure 2J:
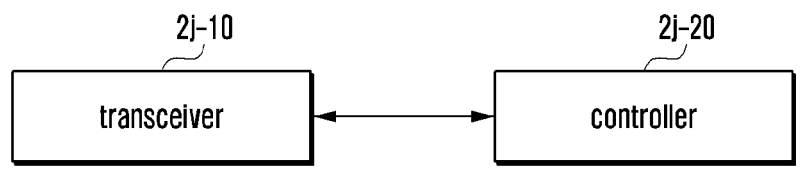
FIG. 2J is a diagram illustrating an example of a block configuration of a base station according to an embodiment of the present disclosure.

FIGS. 1 through 2J, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Hereinafter, the operation principle of the present disclosure will be described in detail with reference to the accompanying drawings. In describing the present disclosure, related well-known functions or configurations incorporated herein are not described in detail in case where it is determined that they obscure the subject matter of the present disclosure in unnecessary detail. Further, terms to be described later are terms defined in consideration of their functions in the present disclosure, but may differ depending on intentions of a user and an operator or customs. Accordingly, they should be defined based on the contents of the whole description of the present disclosure.

In describing the present disclosure, related well-known functions or configurations incorporated herein are not described in detail in case where it is determined that they obscure the subject matter of the present disclosure in unnecessary detail. Hereinafter, embodiments of the present disclosure will be described with reference to the accompanying drawings.

Hereinafter, terms for identifying a connection node, terms for calling network entities, terms for calling messages, terms for calling an interface between network entities, and terms for calling various pieces of identification information, as used in the following description, are exemplified for convenience in explanation. Accordingly, the present disclosure is not limited to the terms to be described later, but other terms for calling subjects having equal technical meanings may be used.

Hereinafter, for convenience in explanation, terms and titles that are defined in the $3^{rd}$ generation partnership project long term evolution (3GPP LTE) standards are used in the present disclosure. However, the present disclosure is not limited by the terms and titles, but can be equally applied to systems following other standards. In the present disclosure, for convenience in explanation, an eNB may be mixedly used with a next generation NodeB (gNB). That is, a base station explained as an eNB may be represented as a gNB.

In case of applying a method for configuring a bearer-based QoS as in the current LTE system, a group of several flows is handled as the same QoS in a network. Accordingly, more precise QoS adjustment is not possible at core network and access network ends. Accordingly, in the present disclosure, a method for configuring a flow-based QoS rather than a bearer-based QoS is introduced, and a new SDAP layer on a PDCP layer to process the flow-based QoS is introduced. Further, a method and an operation for configuring a PDCP layer and a SDAP layer for supporting this are proposed.

The present disclosure relates to a method and an apparatus for configuring QoS information in a next-generation mobile communication system.

FIG. 1A is a diagram illustrating the structure of an LTE system on which embodiments of the present disclosure are implemented.

Referring to FIG. 1A, as illustrated, a radio access network of an LTE system is composed of evolved node Bs (hereinafter referred to as "ENBs", "node Bs", or "base stations") 1a-05, 1a-10, 1a-15, and 1a-20, a mobility management entity (MME) 1a-25, and a serving-gateway (S-GW) 1a-30. User equipment (hereinafter referred to as "UE" or "terminal") 1a-35 accesses to an external network through the ENBs 1a-05 to 1a-20 and the S-GW 1a-30.

In FIG. 1A, the ENB 1a-05 to 1a-20 corresponds to an existing node B of a UMTS system. The ENB is connected to the UE 1a-35 on a radio channel, and plays a more complicated role than that of the existing node B. In the LTE system, since all user traffics including a real-time service, such as a voice over internet protocol (VoIP) through an internet protocol are serviced on shared channels, devices performing scheduling through consolidation of state information, such as a buffer state, an available transmission power state, and a channel state of each UE, are necessary, and the ENBs 1a-05 to 1a-20 correspond to such scheduling devices. In general, one ENB controls a plurality of cells. For example, in order to implement a transmission speed of 100 Mbps, the LTE system uses, for example, orthogonal frequency division multiplexing (hereinafter referred to as "OFDM") in a bandwidth of 20 MHz as a radio access technology. Further, the LTE system adopts an adaptive modulation & coding (hereinafter referred to as "AMC") scheme that determines a modulation scheme and a channel coding rate to match the channel state of the terminal. The S-GW 1a-30 is a device that provides a data bearer, and generates or removes the data bearer under the control of the MME 1a-25. The MME is a device that takes charge of not only mobility management of the terminal but also various kinds of control functions, and is connected to the plural base stations.

FIG. 1B is a diagram illustrating a radio protocol structure of an LTE system on which embodiments of the present disclosure are implemented.

Referring to FIG. 1B, in UE or an ENB, a radio protocol of an LTE system is composed of a packet data convergence protocol (PDCP) 1b-05 or 1b-40, a radio link control (RLC) 1b-10 or 1b-35, and a medium access control (MAC) 1b-15 or 1b-30. The packet data convergence protocol (PDCP) 1b-05 or 1b-40 takes charge of IP header compression/decompression operations. The main functions of the PDCP are summarized as follows.

Header compression and decompression: ROHC only
    Transfer of user data
    In-sequence delivery of upper layer PDUs at PDCP reestablishment procedure for RLC AM
    For split bearers in DC (only support for RLC AM): PDCP PDU routing for transmission and PDCP PDU reordering for reception
    Duplicate detection of lower layer SDUs at PDCP reestablishment procedure for an RLC AM
    Retransmission of PDCP SDUs at handover and, for split bearers in DC, of PDCP PDUs at a PDCP data-recovery procedure, for an RLC AM
    Ciphering and deciphering
    Timer-based SDU discard in uplink The radio link control (hereinafter, RLC) 1b-10 or 1b-35 reconfigures a PDCP PDU with a proper size and performs an ARQ operation and the like. The main functions of the RLC are summarized as follows.

Transfer of upper layer PDUs
    Error correction through ARQ (only for AM data transfer)
    Concatenation, segmentation, and reassembly of RLC SDUs (only for UM and AM data transfer)
    Re-segmentation of RLC data PDUs (only for AM data transfer)
    Reordering of RLC data PDUs (only for UM and AM data transfer)
    Duplicate detection (only for UM and AM data transfer)
    Protocol error detection (only for AM data transfer)
    RLC SDU discard (only for UM and AM transfer)
    RLC reestablishment The MAC 1b-15 or 1b-30 is connected to several RLC layer devices configured in one terminal, and performs multiplexing/demultiplexing of RLC PDUs into/from MAC PDU. The main functions of the MAC are summarized as follows.

Mapping between logical channels and transport channels
    Multiplexing/demultiplexing of MAC SDUs belonging to one or different logical channels into/from transport blocks (TB) transferred to/from the physical layer on transport channels
    Scheduling information reporting
    HARQ function (error correction through HARQ)
    Priority handling between logical channels of one UE
    Priority handling between UEs by means of dynamic scheduling
    MBMS service identification
    Transport format selection
    padding The physical layer 1b-20 or 1b-25 performs channel coding and modulation of upper layer data to configure and transmit OFDM symbols to a radio channel, or performs demodulation and channel decoding of the OFDM symbols received on the radio channel to transfer the demodulated and channel-decoded data to an upper layer.

FIG. 1C is an exemplary diagram illustrating the structure of a next-generation mobile communication system on which embodiments of the present disclosure are implemented.

Referring to FIG. 1C, as illustrated, a radio access network of a next-generation mobile communication system (hereinafter referred to as "NR" or "5G") is composed of a new radio node B (hereinafter referred to as "NR gNB" or "NR ENB") 1c-10 and a new radio core network (NR CN) 1c-05. A new radio user equipment (hereinafter referred to as "NR UE" or "terminal") 1c-15 accesses to an external network through the NR gNB 1c-10 and the NR CN 1c-05.

In FIG. 1C, the NR gNB 1c-10 corresponds to an evolved node B (ENB) of the existing LTE system. The NR gNB is connected to the NR UE 1c-15 on a radio channel, and can provide a more superior service than the service of the existing node B. Since all user traffics are serviced on shared channels in the next-generation mobile communication system, a device that performs scheduling through consolidation of status information, such as a buffer state, an available transmission power state, and a channel state of each UE, is necessary, and the NR gNB 1c-10 takes charge of this. One NR gNB generally controls a plurality of cells. In order to implement ultrahigh-speed data transmission as compared with the existing LTE, the NR gNB may have a maximum bandwidth that is higher than the existing bandwidth, and a beamforming technology may be additionally grafted in consideration of orthogonal frequency division multiplexing (hereinafter, OFDM) as a radio connection technology. Further, an adaptive modulation & coding (hereinafter referred to as "AMC") scheme determining a modulation scheme and a channel coding rate to match the channel state of the UE is adopted. The NR CN 1c-05 performs functions of mobility support, bearer configuration, and QoS configuration. The NR CN is a device taking charge of not only a terminal mobility management function but also various kinds of control functions, and is connected to a plurality of ENBs. Further, the next-generation mobile communication system may interlock with the existing LTE system, and the NR CN is connected to an MME 1c-25 through a network interface. The MME is connected to an ENB 1c-30 that is the existing base station.

FIG. 1D is an exemplary diagram illustrating a radio protocol structure of a next-generation mobile communication system on which embodiments of the present disclosure are implemented.

Referring to FIG. 1D, in UE or an NR ENB, a radio protocol of the next-generation mobile communication system is composed of an NR PDCP 1d-05 or 1d-40, an NR RLC 1d-10 or 1d-35, and an NR MAC 1d-15 or 1d-30. The main function of the NR PDCP 1d-05 or 1d-40 may include parts of the following functions.

Header compression and decompression: ROHC only
    Transfer of user data
    In-sequence delivery of upper layer PDUs
    Out-of-sequence delivery of upper layer PDUs
    PDCP PDU reordering for reception
    Duplicate detection of lower layer SDUs
    Retransmission of PDCP SDUs
    Ciphering and deciphering
    Timer-based SDU discard in uplink As described above, reordering of the NR PDCP devices may mean reordering of PDCP PDUs received from a lower layer based on PDCP sequence numbers (SNs). The reordering may include delivery of data to an upper layer in the order of reordering or direct transfer of data without considering the order, recording of lost PDCP PDUs through reordering, status report for the lost PDCP PDUs to a transmission side, and retransmission request for the lost PDCP PDUs.

The main functions of the NR RLC 1d-10 or 1d-35 may include parts of the following functions.

Transfer of upper layer PDUs
In-sequence delivery of upper layer PDUs
Out-of-sequence delivery of upper layer PDUs
Error correction through an ARQ
Concatenation, segmentation, and reassembly of RLC SDUs
Re-segmentation of RLC data PDUs
Reordering of RLC data PDUs
Duplicate detection
Protocol error detection
RLC SDU discard
RLC reestablishment As described above, in-sequence delivery of NR RLC devices may mean in-sequence delivery of RLC SDUs received from a lower layer to an upper layer. In case where one original RLC SDU is segmented into several RLC SDUs to be received, the delivery may include reassembly and delivery of the RLC SDUs, reordering of the received RLC PDUs based on an RLC sequence number (SN) or a PDCP sequence number (SN), recording of lost RLC PDUs through reordering, status report for the lost RLC PDUs to a transmission side, retransmission request for the lost PDCP PDUs, in-sequence delivery of only RLC SDUs just before the lost RLC SDU to an upper layer if there is the lost RLC SDU, in-sequence delivery of all RLC SDUs received before a specific timer starts its operation to an upper layer if the timer has expired although there is the lost RLC SDU, or in-sequence delivery of all RLC SDUs received up to now to an upper layer if the timer has expired although there is the lost RLC SDU. Further, the RLC PDUs may be processed in the order of their reception (in the order of their arrival regardless of the order of sequence numbers) and may be transferred to a PDCP device in an out-of-sequence delivery manner. In case of segments, the segments stored in a buffer or to be received later are received and reconfigured into one complete RLC PDU to be processed and transferred to the PDCP device. The NR RLC layer may not include a concatenation function, and the function may be performed by an NR MAC layer or may be replaced by a multiplexing function of the NR MAC layer.

As described above, the out-of-sequence delivery of the NR RLC device means a function of transferring the ROC SDUs received from a lower layer directly to an upper layer regardless of their order. If one original RLC SDU is segmented into several RLC SDUs to be received, the delivery may include reassembly and delivery of the RLC SDUs, and recording of lost RLC PDUs through storing and ordering the RLC SNs or PDCP SNs of the received RLC PDUs.

The NR MAC 1d-15 or 1d-30 may be connected to several NR RLC layer devices configured in one terminal, and the main functions of the NR MAC may include parts of the following functions.

Mapping between logical channels and transport channels
Multiplexing/demultiplexing of MAC SDUs
Scheduling information reporting
HARQ function (error correction through HARQ)
Priority handling between logical channels of one UE
Priority handling between UEs by means of dynamic scheduling
MBMS service identification
Transport format selection
padding The NR PHY layer 1d-20 or 1d-25 may perform channel coding and modulation of upper layer data to configure and transmit OFDM symbols on a radio channel, or may perform demodulation and channel decoding of the OFDM symbols received on the radio channel to transfer the demodulated and channel-decoded data to an upper layer.

FIGS. 1EA through 1EC are a diagram illustrating new layers and functions for handling a QoS in a next-generation system according to one embodiment of the present disclosure.

A next-generation system is required to configure a user traffic transmission path in accordance with a service for requesting different qualities of service (hereinafter, QoS), for example, in accordance with QoS requirements, or to control an IP flow for each service. In the next-generation mobile communication system, a plurality of IP flows may be mapped to a plurality of data radio bearers (DRBs). Further, mapping of the plurality of IP flows to the plurality of DRBs may be simultaneously configured. For example, since with respect to a downlink, a plurality of IP flows 1e-01, 1e-02, and 1e-03 can be mapped to the same DRBs or different DRBs 1e-10, 1e-15, and 1e-20. Accordingly, it is necessary to perform packet marking of the QoS flow ID on the downlink packet to discriminate the mapping. Since the above-described function is not provided in the existing LTE PDCP layer, it is required to introduce a new layer (it may be called an SDAP or other names) 1e-05, 1e-40, 1e-50, or 1e-85 to take charge of this.

The specific marking of the QoS flow ID on the downlink packet as described above is a simple method for an access stratum (AS) of the terminal to provide the information to a NAS of the terminal. A method for mapping IP flows to DRBs in a downlink may be performed in two stages below.

1. NAS level mapping: IP flow→QoS flow (QoS flow ID marking)
2. AS level mapping: QoS flow→DRB During the downlink reception (terminal), existence/non-existence of QoS flow mapping information and reflective QoS operation can be grasped for respective received DRBs 1e-25, 1e-30, and 1e-35, and corresponding information can be transferred to the NAS. The use of the reflective QoS means that the terminal identifies the QoS flow IDs of the IP flows received on the downlink and stores the identified QoS flow IDs of the IP flows, and if uplink data for the corresponding IP flow is generated, the terminal marks the same QoS flow ID identified through the downlink and transfers the QoS flow ID to the base station through the uplink.

Accordingly, as for the uplink, in the same manner as the downlink, two-stage mapping may be used. First, the terminal may map the IP flows to the QoS flows through NAS signaling, and the AS may map the QoS flows to the determined DRBs 1e-55, 1e-60, and 1e-65. The terminal may mark the QoS flow ID on the uplink packet, or may transfer the packet as it is without marking the QoS flow ID in accordance with the bearer or logical configuration. The above-described function is performed by the new layer (service data association protocol (SDAP)) of the terminal. If the QoS flow ID is marked on the uplink packet, the base station may mark the QoS flow ID on the packet transferring the information to an NG-U without a traffic flow template (TFT) to transfer the packet.

Specifically, in the present disclosure, an operation in which a new layer (SDAP layer) introduced to process the QoS for each IP flow in the transmission end/reception end processes an IP packet is as follows.

The new layer may be called a service data association protocol (SDAP) or other names. The function of the new layer may include the following functions.

1. Function of routing or mapping QoS flows to DRBs
2. Function of marking QoS flow identifiers (IDs) on downlink packets
3. Function of marking QoS flow identifiers (IDs) on uplink packets For example, if it is required to attach an SDAP header when an IP packet is received, the new SDAP layer may insert the QoS flow ID or other necessary information into the SDAP header through application of mapping information of the IP flow and QoS flow predetermined in the network. Further, the SDAP layer may attach the SDAP header in front of the IP packet, and transfer the IP packet to a bearer or a PDCP layer suitable to the QoS.

FIG. 1F is a diagram illustrating a procedure in which a base station configures respective layer entities (hereinafter, entities) and bearers through RRC signaling (message) in a next-generation mobile communication system according to the present disclosure.

As shown in FIG. 1F, which a terminal configures a connection with a network and configures respective layer entities (hereinafter, entities) to transmit/receive data, and for example, a procedure in which a terminal configures SDAP entities and PDCP entities that are new layer entities.

If data to be transmitted is generated, the UE terminal that has not currently configured a connection (hereinafter, idle mode UE) 1*f*-01 may perform an RRC connection establishment process with an LTE base station or an NR base station 1*f*-02. The terminal 1*f*-01 may establish reverse transmission synchronization with the base station 1*f*-02 through a random access process, and transmit an RRCConnectionRequest message to the base station 1*f*-02 (1*f*-05). The message may contain the reason for the intention to configure a connection with an identifier of the terminal 1*f*-01.

The base station 1*f*-02 may transmit an RRCConnectionSetup message so that the terminal 1*f*-01 configures the RRC connection (1*f*-10). The message may contain RRC connection configuration information and configuration information of each layer. For example, the message may include configuration information on a PHY or NR PHY device, a MAC or NR MAC device, an RLC or NR RLC device, and a PDCP or NR PDCP device, and may also include information indicating configuration of specific functions among functions supported by the layer entities (layer functions as described above with reference to FIG. 1B or 1D). Further, the message may include mapping information between logical channels (LCHs) and logical channel groups (LCGs), mapping information on the logical channels or logical channel groups and TTI, and information indicating whether the logical channels or logical channel groups are for a URLLC service. Further, the message may include mapping information between a PDCP device and an SDAP device provided in PDCP configuration information (PDCP-config) or logical channel configuration information (logicalchannelconfig) (e.g., the mapping information may be indicated using an SDAP identifier, DRB identifier, PDCP identifier, and LCH identifier), an indicator indicating existence/nonexistence of the SDAP header for each logical channel, for each bearer, or for the whole (the SDAP layer entity may determine whether to use the SDAP header, for example, the SDAP layer may basically determine not to use the SDAP header if the indicator does not exist, whereas it may basically determine to use the SDAP header), and a QoS flow id list (the corresponding PDCP entity, logical channel, or bearer indicates a list of QoS flows that can be transmitted/received). Further, the message may include information indicating whether to mark and use the QoS flow ID for each logical channel or bearer in a state where the SDAP header is always used. If the message is received, the terminal 1*f*-01 may connect the respective PDCP devices and the respective SDAP devices to each other (logical connection, e.g., configuration of mapping or transfer of QoS flows of what SDAP device to what PDCP devices). The mapping information between the PDCP devices and the SDAP devices of the message may be optional. For example, if the mapping information does not exist in the message, the respective PDCP devices may be connected to default SDAP devices (default SDAP devices may also be indicated in the message). In the same manner, the existence/nonexistence of the SDAP header may also be optional in the message. For example, if there is no indicator indicating the existence/nonexistence of the SDAP header, it may be considered that the header always exists or does not exist.

The RRC connection is also called a signaling radio bearer (SRB), and may be used to transmit/receive an RRC message that is a control message between the UE terminal 1*f*-01 and the eNB or gNB base station 1*f*-02. The terminal having configured the RRC connection may transmit an RRCConnectionSetupComplete message to the base station 1*f*-02 (1*f*-15). The base station 1*f*-02 may transmit an RRCConnectionReconfiguration message to the UE terminal 1*f*-01 to configure a data radio bearer (DRB) (1*f*-20). The message may contain RRC connection configuration information and configuration information of each layer. For example, the message may include configuration information on a PHY or NR PHY device, a MAC or NR MAC device, an RLC or NR RLC device, and a PDCP or NR PDCP device, and may also include information indicating configuration of specific functions among functions supported by the layer entities (layer functions as described above with reference to FIG. 1B or 1D). Further, the message may include mapping information between logical channels (LCHs) and logical channel groups (LCGs), mapping information on the logical channels or logical channel groups and TTI, and information indicating whether the logical channels or logical channel groups are for a URLLC service. Further, the message may include mapping information between a PDCP device and an SDAP device provided in PDCP configuration information (PDCP-config) or logical channel configuration information (logicalchannelconfig) (e.g., the mapping information may be indicated using an SDAP identifier, DRB identifier, PDCP identifier, and LCH identifier), an indicator indicating existence/nonexistence of the SDAP header for each logical channel, for each bearer, or for the whole (the SDAP layer entity may determine whether to use the SDAP header, for example, the SDAP layer may basically determine not to use the SDAP header if the indicator does not exist, whereas it may basically determine to use the SDAP header), a QoS flow id list (the corresponding PDCP entity, logical channel, or bearer indicates a list of QoS flows that can be transmitted/received), and information indicating whether to mark and use the QoS flow ID for each logical channel or bearer in a state where the SDAP header is always used.

If the message is received, the UE terminal 1*f*-01 may connect the respective PDCP devices and the respective SDAP devices to each other (logical connection, e.g., configuration of mapping or transfer of QoS flows of what SDAP device to what PDCP devices). The mapping information between the PDCP devices and the SDAP devices of the message may be optional. That is, if the mapping information does not exist in the message, the respective PDCP devices may be connected to default SDAP devices (default SDAP devices may also be indicated in the message). In the same manner, the existence/nonexistence of the SDAP header may also be optional in the message. For example, if there is no indicator indicating the existence/ nonexistence of the SDAP header, it may be considered that the header always exists or does not exist. That is, the message includes configuration information of the DRB in which user data is to be processed, and the terminal 1*f*-01 may configure the DRB by applying the information, configure functions of the respective layers, and transmit an RRCConnectionReconfigurationComplete message to the base station 1*f*-02 (1*f*-25).

If the above-described processes are completed in all, the terminal 1*f*-01 may transmit/receive data to/from the base station 1*f*-02 (1*f*-30). During the transmission/reception of the data, the base station 1*f*-02, if necessary, may resend the RRCConnectionReconfiguration message to the terminal 1*f*-01 (1*f*-35) to reconfigure the configuration information of respective layers of the terminal 1*f*-01. The message may contain RRC connection configuration information and configuration information of each layer. For example, the message may include configuration information on a PHY or NR PHY device, a MAC or NR MAC device, an RLC or NR RLC device, and a PDCP or NR PDCP device, and may also include information indicating configuration of specific functions among functions supported by the layer entities (layer functions as described above with reference to FIG. 1B or 1D). Further, the message may include mapping information between logical channels (LCHs) and logical channel groups (LCGs), mapping information on the logical channels or logical channel groups and TTI, and information indicating whether the logical channels or logical channel groups are for a URLLC service. Further, the message may include mapping information between a PDCP device and an SDAP device provided in PDCP configuration information (PDCP-config) or logical channel configuration information (logicalchannelconfig) (e.g., the mapping information may be indicated using an SDAP identifier, DRB identifier, PDCP identifier, and LCH identifier), an indicator indicating existence/nonexistence of the SDAP header for each logical channel, for each bearer, or for the whole (the SDAP layer entity may determine whether to use the SDAP header, for example, the SDAP layer may basically determine not to use the SDAP header if the indicator does not exist, whereas it may basically determine to use the SDAP header), a QoS flow id list (the corresponding PDCP entity, logical channel, or bearer indicates a list of QoS flows that can be transmitted/received), and information indicating whether to mark and use the QoS flow ID for each logical channel or bearer in a state where the SDAP header is always used. If the message is received, the terminal 1*f*-01 may connect the respective PDCP devices and the respective SDAP devices to each other (logical connection, i.e., configuration of mapping or transfer of QoS flows of what SDAP device to what PDCP devices). The mapping information between the PDCP devices and the SDAP devices of the message may be optional. For example, if the mapping information does not exist in the message, the respective PDCP devices may be connected to default SDAP devices (default SDAP devices may also be indicated in the message). In the same manner, the existence/nonexistence of the SDAP header may also be optional in the message. For example, if there is no indicator indicating the existence/nonexistence of the SDAP header, it may be considered that the header always exists or does not exist. If the configuration of the respective layer entities is completed in accordance with the above-described message, the terminal 1*f*-01 may transmit the RRCConnectionReconfigurationComplete message to the base station 1*f*-02 (1*f*-40).

FIG. 1G is a diagram illustrating a header and data structure according to each layer according to the present disclosure.

For each layer, a suitable header may be concatenated as shown as 1*g*-05 in FIG. 1G. If it is determined that the SDAP header is unnecessary or if it is configured that the use of the SDAP header is inactivated as described above, as shown as 1*g*-10, the header for the SDAP layer may be omitted, and data processing may proceed.

As described above, in the next-generation mobile communication system, a new layer called an SDAP layer may be introduced. Further, an SDAP header for the new layer may be provided for each IP packet. The SDAP header may include a QoS identifier called a QoS flow ID. However, it may cause a great burden in view of the processing of the base station and the terminal to always mark the QoS flow ID on the SDAP header for each IP packet. For example, at a high data rate, it may be required for the base station or the terminal to mark or read QoS flow IDs (QFI) of 1,600,000 IP packets per second. Further, it may be disadvantageous in view of an overhead to always configure the SDAP header.

Accordingly, the present disclosure proposes a method for processing the above-described QoS for each IP flow.

In the next-generation mobile communication system, methods for processing the QoS for each IP flow are as follows.

1. The 1-1 embodiment: A case where it is intended to always use the SDAP header A. An 1-bit indicator is defined in the SDAP header to indicate whether the QoS flow ID has been marked through the 1-bit indicator. Indication of whether to use the QoS flow ID for each logical channel, bearer, or IP flow can be provided to a PDCP control PDU or MAC CE.

2. The 1-2 embodiment: A case where it is intended to be able to dynamically use the SDAP header regardless of the configuration of the base station A. An 1-bit indicator is defined in the PDCP header to be able to know existence/nonexistence of the SDAP header through the 1-bit indicator.

3. The 1-3 embodiment: A case where the base station configures a PDCP control PDU and it can be configured for each logical channel or bearer whether the SDAP header is used A. It can be indicated whether the SDAP header exists from what COUNT (or PDCP sequence number) using the COUNT of the PDCP layer (or PDCP sequence number). A PDCP control PDU can be used as a method for the indication. Further, it may be intended to be able to know existence/nonexistence of the SDAP header through 1-bit indicator defined in the PDCP header (the 1-bit indicator may not be defined in the PDCP header since it can be known whether the SDAP header exists from what COUNT value (or PDCP sequence number) through the COUNT value (or PDCP sequence number)).

B. It is intended to be able to know existence/nonexistence of the SDAP header through 1-bit indicator defined in the PDCP header.

4. The 1-4 embodiment: A case where the base station configures a MAC CE and it can be configured for each logical channel or bearer whether the SDAP header is used A. It can be indicated whether the SDAP header exists from what COUNT (or PDCP sequence number) using the COUNT of the PDCP layer (or PDCP sequence number). A MAC CE can be used as a method for the indication (the 1-bit indicator may not be defined in the PDCP header since it can be known whether the SDAP header exists from what COUNT value (or PDCP sequence number) through the COUNT value (or PDCP sequence number)).

B. It is intended to be able to know existence/nonexistence of the SDAP header through 1-bit indicator defined in the PDCP header.

FIG. 1H is a diagram illustrating the 1-1 embodiment for processing a QoS for each IP flow in a next-generation mobile communication system according to the present disclosure.

In the 1-1 embodiment of the present disclosure, it is considered to always use the SDAP header in a data processing procedure as shown as 1g-05 of FIG. 1G. However, as described above, it may cause a processing burden that the base station and the terminal always identify the QoS flow ID of the SDAP header, identify and store a mapping relationship with an IP flow or data radio bearer (DRB), or mark the QoS flow ID. Accordingly, in the 1-1 embodiment of the present disclosure, it is possible to define 1-bit indicator (M field) indicating whether the QoS flow ID has been marked on the SDAP header as shown as 1h-05. Another new field may be defined on the SDAP header of 1h-05, respective fields or QoS flow ID fields may be designated to have different sizes, and the size of the SDAP header may be determined in accordance with the defined size.

As described above, if 1-bit M field indicating whether to mark the QoS flow ID is used in the SDAP header in consideration of the SDAP header being always used, a procedure of processing the QoS for each IP flow is as described in Table 1 below.

TABLE 1

| Terminal | Signaling direction | Base station | Terminal or base station operation |
|---|---|---|---|
| UE | ← → | gNB | Terminal and base station configure connection in RRC Connection establishment procedure. |
|  |  | gNB | Base station may determine DRB and SDAP device configuration for each PDU session, and may determine whether to use reflective QoS for each PDU session or DRB. |
| UE | ← | gNB | Base station transmits to terminal DRB configuration or PDCP/RLC/MAC device configuration and SDAP device configuration information for each logical channel group or DRB group in RRC Connection Reconfiguration, and terminal identifies the information, configures and applies respective devices. |
| UE | ← | gNB | If downlink data is generated, and it is determined not to mark the QoS flow ID with respect to corresponding PDU session, DRB, or IP flow, the base station may indicate that QoS flow ID has not been marked through |

TABLE 1-continued

| Terminal | Signaling direction | Base station | Terminal or base station operation |
|---|---|---|---|
|  |  |  | configuration of 1-bit M field of SDAP header (0 or 1), and may transmit data packets to terminal. |
| UE |  |  | Terminal may receive downlink data, and SDAP layer entity may identify 1-bit M field of SDAP header, immediately delete a header if the QoS flow ID has not been marked, and transfer the same to upper layer. If the 1-bit M field indicates that the QoS flow ID has been marked, the SDAP layer entity may identify the QoS flow ID, store mapping information of corresponding IP flow, DRB, and QoS flow ID, and later apply the information during uplink data transmission in corresponding link IP flow or DRB (reflective QoS). |
| UE | → | gNB | If data to be transmitted to uplink is generated, terminal identifies mapping information of corresponding IP flow, QoS flow ID, and DRB, and if the mapping information of corresponding QoS flow ID and DRB exists and it is necessary to mark the QoS flow ID on the corresponding IP flow, the terminal configures 1-bit M field through marking on the SDAP header and transmits data to corresponding DRB. If there exists mapping information of corresponding QoS flow ID and DRB and it is not necessary to mark QoS flow ID on corresponding IP flow, the terminal configures 1-bit M field to the PDCP header without marking the QoS flow ID on the SDAP header, and transmits data to corresponding DRB. If there is no mapping information of the corresponding QoS flow ID and DRB, the terminal transmits data to default DRB. |

Although the 1-bit M field of the SDAP header may indicate whether to use the QoS flow ID as described above, the base station may indicate whether to use the QoS flow ID for each logical channel, bearer, or IP flow through the PDCP control PDU or MAC CE. For example, the base station may directly configure whether to use the QoS flow ID from what COUNT value through indication of the COUNT value used in the PDCP layer entity through the PDCP control PDU or MAC CE. Further, the 1-bit indicator may be defined in the PDCP header rather than the SDAP header to indicate whether the QoS flow ID has been marked.

FIG. 1I is a diagram illustrating the 1-2 embodiment for processing a QoS for each IP flow in a next-generation mobile communication system according to the present disclosure.

In the 1-2 embodiment of the present disclosure, it is considered that the SDAP header is used or is not used in a data processing procedure as shown as 1g-05 or 1g-10 of FIG. 1G. For example, a scenario in which the SDAP header may be dynamically used or may not be used is considered. That is, when a transmission end sends data, whether to use the SDAP header may be determined. Accordingly, in the 1-2 embodiment of the present disclosure, it is possible to define 1-bit indicator (S field) indicating whether an SDAP header exists in the PDCP header as shown as 1i-05. Another new field may be defined on the PDCP header of 1i-05, respective fields or sequence number (SN) fields may be designated to have different sizes, and the size of the PDCP header may be determined in accordance with the defined size. In the 1-2 embodiment, if it is determined not to use the QoS flow ID when the transmission end sends data, the transmission end may configure the 1-bit S field of the PDCP header (0 or 1), and may indicate the nonexistence of the SDAP header. Further, if it is determined to use the QoS flow ID, the transmission end may configure the 1-bit S field of the PDCP header, and may indicate the existence of the SDAP header.

As described above, if 1-bit S field indicating whether the SDAP header exists in the PDCP header is used in consideration of the SDAP header being dynamically used, a procedure of processing the QoS for each IP flow is as described in Tables 2 and 3 below.

TABLE 2

| Terminal | Signaling direction | Base station | Terminal or base station operation |
|---|---|---|---|
| UE | ←→ | gNB | Terminal and base station configure connection in RRC Connection establishment procedure. |
|  |  | gNB | Base station may determine DRB and SDAP device configuration for each PDU session, and may determine whether to use reflective QoS for each PDU session or DRB. |
| UE | ← | gNB | Base station transmits to terminal DRB configuration or PDCP/RLC/MAC device configuration |

TABLE 2-continued

| Terminal | Signaling direction | Base station | Terminal or base station operation |
|---|---|---|---|
|  |  |  | and SDAP device configuration information for each logical channel group or DRB group in RRC Connection Reconfiguration, and terminal identifies the information, configures and applies respective devices. In the above configuration, it can be configured whether to use the SDAP header for each PDU session, DRB configuration information, DRB, or IP flow. For example, an indicator may be configured in logical channel configuration information (logicalchannelConfig) or PDCP device configuration information (PDCP-config). |
| UE | ← | gNB | If downlink data is generated, and it is determined not to mark the QoS flow ID with respect to corresponding PDU session, DRB, or IP flow, the base station may indicate that QoS flow ID has not been marked through configuration of 1-bit M field of SDAP header (0 or 1), and may transmit data packets to terminal. If it is determined to use the SDAP header with respect to PDU session, DRB, or IP flow, the base station may indicate existence of the SDAP header through configuration of 1-bit S field of the PDCP header (0 or 1), and may transmit respective data packets to the terminal. |

TABLE 3

| Terminal | Signaling direction | Base station | Terminal or base station operation |
|---|---|---|---|
| UE |  |  | Terminal may receive downlink data, and PDCP layer entity may identify 1-bit S field of PDCP header. If nonexistence of the SDAP header is identified, the PDCP layer entity may notify the SDAP layer entity of this, and the SDAP layer entity may immediately transfer this to upper layer. If the 1-bit S field indicates existence of the SDAP header, the PDCP layer entity may notify the SDAP layer entity of this, and the SDAP layer entity may identify the QoS flow ID, store mapping information of corresponding IP flow, DRB, and QoS flow ID, and later apply the information during uplink data transmission in corresponding link IP flow or DRB (reflective QoS). |
| UE | ← | gNB | If it is desired to reconfigure existence/nonexistence of the SDAP header with respect to PDU session, DRB, or IP flow for specific reason (e.g., two or more IP flows having different QoS flow IDs are mapped to one DRB), the base station may determine this, and may reconfigure this to the terminal through RRC Connection Reconfiguration message. |
| UE | → | gNB | If data to be transmitted to uplink is generated, terminal identifies mapping information of corresponding IP flow, QoS flow ID, and DRB, and if the mapping information of corresponding QoS flow ID and DRB exists and it is necessary to mark the QoS flow ID on the corresponding IP flow (or it is configured to use corresponding SDAP header), the terminal configures 1-bit S field through marking on the PDCP header and transmits data to corresponding DRB. If there exists mapping information of corresponding QoS flow ID and DRB and it is not necessary to mark QoS flow ID on corresponding IP flow (or it is not configured to use corresponding SDAPO header), the terminal configures 1-bit S field to the PDCP header without marking the QoS flow ID on the SDAP header, and transmits data to corresponding DRB. If there is no mapping information |

TABLE 3-continued

| Terminal | Signaling direction | Base station | Terminal or base station operation |
|---|---|---|---|
| | | | of the corresponding QoS flow ID and DRB, the terminal transmits data to default DRB. |

Although the 1-bit S field of the PDCP header may indicate existence/nonexistence of the SDAP header as described above, the base station may indicate whether to use the QoS flow ID (or whether to use the SDAP header) for each logical channel, bearer, or IP flow through the PDCP control PDU or MAC CE. For example, the base station may directly configure whether to use the QoS flow ID (or whether to use the SDAP header) from what COUNT value through indication of the COUNT value used in the PDCP layer entity through the PDCP control PDU or MAC CE.

FIG. 1J is a diagram illustrating the 1-3 embodiment for processing a QoS for each IP flow in a next-generation mobile communication system according to the present disclosure.

In the 1-3 embodiment of the present disclosure, it is considered that the SDAP header is used or is not used in a data processing procedure as shown as 1g-05 or 1g-10 of FIG. 1G. For example, a scenario in which the SDAP header may be dynamically used or may not be used is considered. Specifically, when a transmission end sends data, whether to use the SDAP header may be determined. Accordingly, in the 1-3 embodiment of the present disclosure, it is possible to define a new PDCP control PDU as shown as 1j-05 in order to configure whether to use the SDAP header. For example, a specific value of a PDU type field may be defined as a PDCP control PDU indicating whether to configure the SDAP header. Further, a COUNT value (or PDCP sequence number) may be indicated. As described above, the COUNT value (or PDCP sequence number) may indicate whether the SDAP header exists from what COUNT value (or PDCP sequence number). In order to indicate whether the SDAP header exists, 1-bit indicator may be defined in a PDCP control PDU header, and in order to indicate this, an individual PDU type field (PDCP control PDU indicating existence of the SDAP header or PDCP control PDU indicating nonexistence of the SDAP header) may be defined. Further, as in the 1-1 embodiment and the 1-2 embodiment as described above, 1-bit indicator of the SDAP header or the PDCP header may be used.

Another new field may be defined in a PDCP control PDU format of 1j-05, respective fields may be designated to have different sizes, and the size of the PDCP control PDU may be determined in accordance with the defined size. In the 1-3 embodiment, if it is determined not to use the QoS flow ID (or it is determined not to use the SDAP header) when the transmission end sends data, the transmission end may configure and transmit to the reception end corresponding PDCP control PDU. Further, in case of determining to use the QoS flow ID (or in case of using the SDAP header), the transmission end may configure and transmit to the reception end the corresponding PDCP control PDU.

As described above, whether to configure the SDAP header is indicated to the PDCP control PDU in consideration of the dynamic use of the SDAP header, and a procedure of processing the QoS for each IP flow is as described in Tables 4 and 5 below.

TABLE 4

| Terminal | Signaling direction | Base station | Terminal or base station operation |
|---|---|---|---|
| UE | ← → | gNB | Terminal and base station configure connection in RRC Connection establishment procedure. |
| | | gNB | Base station may determine DRB and SDAP device configuration for each PDU session, and may determine whether to use reflective QoS for each PDU session or DRB. |
| UE | ← | gNB | Base station transmits to terminal DRB configuration or PDCP/RLC/MAC device configuration and SDAP device configuration information for each logical channel group or DRB group in RRC Connection Reconfiguration, and terminal identifies the information, configures and applies respective devices. In the above configuration, it can be configured whether to use the SDAP header for each PDU session, DRB configuration information, DRB, or IP flow. For example, an indicator may be configured in logical channel configuration information (logical channelConfig), DRB configuration information, or PDCP device configuration information (PDCP-config). |
| UE | ← | gNB | If downlink data is generated, and it is configured not to use the SDAP header with respect to corresponding PDU session, DRB, or IP flow, base station may transmit data packets to terminal without including the SDAP header. If it is configured to use the SDAP header with respect to PDU session, DRB, or IP flow, the base station may include the SDAP header and may transmit respective data packets to terminal. |

TABLE 4-continued

| Terminal | Signaling direction | Base station | Terminal or base station operation |
|---|---|---|---|
| UE | | | Terminal may receive downlink data, and if it is configured not to use the SDAP header with respect to logical channel on which data has been received, DRB, or IP flow, the SDAP layer entity may immediately transfer this to upper layer (when the PDCP layer entity transfers PDCP SDU to the SDAP layer, it may notify the SDAP layer of the nonexistence of the SDAP header). If it is configured to use the SDAP header through the above configuration (when the PDCP layer entity transfers PDCP SDU to the SDAP layer, it may notify the SDAP layer of the existence of the SDAP header), the SDAP layer entity may identify the QoS flow ID, store mapping information of corresponding IP flow, DRB, and QoS flow ID, and later apply the information during uplink data transmission in corresponding link IP flow or DRB (reflective QoS). |

TABLE 5

| Terminal | Signaling direction | Base station | Terminal or base station operation |
|---|---|---|---|
| UE | | gNB | If it is desired to configure to use the SDAP header with respect to PDU session, DRB, or IP flow for specific reason (e.g., two or more IP flows having different QoS flow IDs are mapped to one DRB), the base station may determine to use the SDAP header from what COUNT value (or PDCP sequence number), and then configure corresponding PDCP control PDU to transmit the same to the terminal. If it is desired to configure not to use the SDAP header with respect to PDU session, DRB, or IP flow for specific reason (e.g., IP flows having different QoS flow IDs are mapped one by one), the base station may determine not to use the SDAP header from what COUNT value (or PDCP sequence number), and then configure corresponding PDCP control PDU to transmit the same to the terminal. |
| UE | ← | gNB | If the PDCP control PDU is received, terminal identifies whether SDAP header exists from what COUNT value or what PDCP sequence number, and performs transmission end processing (use/nonuse of the SDAP header from determined COUNT) and reception end processing (use/nonuse of the SDAP header from determined COUNT) through application thereof. |
| UE | → | gNB | If data to be transmitted to uplink is generated, terminal identifies mapping information of corresponding IP flow, QoS flow ID, and DRB, and if the mapping information of corresponding QoS flow ID and DRB exists and it is necessary to mark the QoS flow ID on the corresponding IP flow (or it is configured to use corresponding SDAP header), the terminal marks the QoS flow ID on the SDAP header, and transmits data to corresponding DRB. If the mapping information of corresponding QoS flow ID and DRB exists and it is not necessary to mark the QoS flow ID on the corresponding IP flow (or it is not configured to use corresponding SDAP header), the terminal does not use the SDAP header, and transmits data to the corresponding DRB. If there is no mapping information of the corresponding QoS flow ID and DRB, the terminal transmits data to default DRB. |

As described above, the base station may indicate whether to use the QoS flow ID (or whether to use the SDAP header) for each logical channel, bearer, or IP flow through the PDCP control PDU or MAC CE. For example, the base station may directly configure whether to use the QoS flow ID (or whether to use the SDAP header) from what COUNT value through indication of the COUNT value (or PDCP sequence number) used in the PDCP layer entity through the PDCP control PDU or MAC CE. Further, as in the 1-1 embodiment and the 1-2 embodiment, the base station may use 1-bit indicator of the PDCP header and 1-bit indicator of the SDAP header together.

FIG. 1K is a diagram illustrating the 1-4 embodiment for processing a QoS for each IP flow in a next-generation mobile communication system according to the present disclosure.

In the 1-4 embodiment of the present disclosure, it is considered that the SDAP header is used or is not used in a data processing procedure as shown as 1g-05 or 1g-10 of FIG. 1G. For example, a scenario in which the SDAP header may be dynamically used or may not be used is considered. Specifically, when a transmission end sends data, whether to use the SDAP header may be determined. Accordingly, in the 1-4 embodiment of the present disclosure, it is possible to define a new MAC CE as shown as 1k-05 in order to configure whether to use the SDAP header. For example, a specific value of LCID field of a MAC sub-header may be defined as a MAC CE indicating whether to configure the SDAP header. Further, a COUNT value (or PDCP sequence number) may be indicated. As described above, the COUNT value (or PDCP sequence number) may indicate whether the SDAP header exists from what COUNT value (or PDCP sequence number). In order to indicate whether the SDAP header exists, 1-bit indicator may be defined in a MAC sub-header or MAC CE, and in order to indicate this, an individual LCID field (MAC CE indicating existence of the SDAP header or MAC CE indicating nonexistence of the SDAP header) may be defined. Further, as in the 1-1 embodiment and the 1-2 embodiment as described above, 1-bit indicator of the SDAP header or the PDCP header may be used.

Another new field may be defined in a MAC CE format of 1k-05, respective fields may be designated to have different sizes, and the size of the MAC CE may be determined in accordance with the defined size. In the 1-4 embodiment, if it is determined not to use the QoS flow ID (or it is determined not to use the SDAP header) when the transmission end sends data, the transmission end may configure and transmit to the reception end corresponding MAC CE. Further, in case of determining to use the QoS flow ID (or in case of using the SDAP header), the transmission end may configure and transmit to the reception end the corresponding MAC CE.

As described above, whether to configure the SDAP header is indicated to the MAC CE in consideration of the dynamic use of the SDAP header, and a procedure of processing the QoS for each IP flow is as described in Tables 6 and 7 below.

TABLE 6

| Terminal | Signaling direction | Base station | Terminal or base station operation |
|---|---|---|---|
| UE | ← → | gNB | Terminal and base station configure connection in RRC Connection establishment procedure. |
|  |  | gNB | Base station may determine DRB and SDAP device configuration for each PDU session, and may determine whether to use reflective QoS for each PDU session or DRB. |
| UE | ← | gNB | Base station transmits to terminal DRB configuration or PDCP/RLC/MAC device configuration and SDAP device configuration information for each logical channel group or DRB group in RRC Connection Reconfiguration, and terminal identifies the information, configures and applies respective devices. In the above configuration, it can be configured whether to use the SDAP header for each PDU session, DRB configuration information, DRB, or IP flow. For example, an indicator may be configured in logical channel configuration information (logicalchannelConfig), DRB configuration information, or PDCP device configuration information (PDCP-config). |
| UE | ← | gNB | If downlink data is generated, and it is configured not to use the SDAP header with respect to corresponding PDU session, DRB, or IP flow, base station may transmit data packets to terminal without including the SDAP header. If it is configured to use the SDAP header with respect to PDU session, DRB, or IP flow, the base station may include the SDAP header and may transmit respective data packets to terminal. |
| UE |  |  | Terminal may receive downlink data, and if it is configured not to use the SDAP header with respect to logical channel on which data has been received, DRB, or IP flow, the SDAP layer entity may immediately transfer this to upper layer (when the PDCP layer entity transfers PDCP SDU to the SDAP layer, it may notify the SDAP layer of the nonexistence of the SDAP header). If it is configured to use the SDAP header through the above configuration (when the PDCP layer entity transfers PDCP SDU to the SDAP layer, it may notify the SDAP layer of the existence of the SDAP header), the SDAP layer entity may identify the QoS flow ID, store mapping information of corresponding IP flow, DRB, and QoS flow ID, and later apply the information during uplink data transmission in corresponding link IP flow or DRB (reflective QoS). |

TABLE 7

| Terminal | Signaling direction | Base station | Terminal or base station operation |
|---|---|---|---|
| UE |  | gNB | If it is desired to configure to use the SDAP header with respect to PDU session, DRB, or IP flow for specific reason (e.g., two or more IP flows having different QoS flow IDs are mapped to one DRB), the base station may determine to use the SDAP header from what COUNT value (or PDCP sequence number), and then configure corresponding MAC CE to transmit the same to the terminal. If it is desired to configure not to use the SDAP header with respect to PDU session, DRB, or IP flow for specific reason (e.g., IP flows having different QoS flow IDs are mapped one by one), the base station may determine not to use the SDAP header from what COUNT value (or PDCP sequence |

TABLE 7-continued

| Terminal | Signaling direction | Base station | Terminal or base station operation |
|---|---|---|---|
| UE | ← | gNB | number), and then configure corresponding MAC CE to transmit the same to the terminal. If the MAC CE is received, terminal identifies whether SDAP header exists from what COUNT value or what PDCP sequence number, and performs transmission end processing (use/nonuse of the SDAP header from determined COUNT) and reception end processing (use/nonuse of the SDAP header from determined COUNT) through application thereof. |
| UE | → | gNB | If data to be transmitted to uplink is generated, terminal identifies mapping information of corresponding IP flow, QoS flow ID, and DRB, and if the mapping information of corresponding QoS flow ID and DRB exists and it is necessary to mark the QoS flow ID on the corresponding IP flow (or it is configured to use corresponding SDAP header), the terminal marks the QoS flow ID on the SDAP header, and transmits data to corresponding DRB. If the mapping information of corresponding QoS flow ID and DRB exists and it is not necessary to mark the QoS flow ID on the corresponding IP flow (or it is not configured to use corresponding SDAP header), the terminal does not use the SDAP header, and transmits data to the corresponding DRB. If there is no mapping information of the corresponding QoS flow ID and DRB, the terminal transmits data to default DRB. |

As described above, the base station may indicate whether to use the QoS flow ID (or whether to use the SDAP header) for each logical channel, bearer, or IP flow through the PDCP control PDU or MAC CE. For example, the base station may directly configure whether to use the QoS flow ID (or whether to use the SDAP header) from what COUNT value through indication of the COUNT value (or PDCP sequence number) used in the PDCP layer entity through the PDCP control PDU or MAC CE. Further, as in the 1-1 embodiment and the 1-2 embodiment, the base station may use 1-bit indicator of the PDCP header and 1-bit indicator of the SDAP header together.

In the present disclosure, a default bearer may be configured to always use the SDAP header (to always mark the QoS flow ID).

If there is not mapping information of the QoS flow ID or DRB with respect to data packets of the generated IP flows, the terminal may transmit the data packets to the default bearer. Accordingly, it is necessary for the base station to identify the QoS flow ID information of the data packets received in the default bearer and to identify whether the data packets are packets suitable to the default bearer. For example, if the QoS flow ID of the packet is not suitable to the default bearer, it means that the terminal transmits the same to the default bearer since there is not suitable bearer. Accordingly, it is necessary for the base station to configure a bearer suitable to the data packet to the terminal. If there is not the SDAP header or QoS flow ID in the default bearer in the above-described procedure, the base station is unable to identify whether the packet is suitable to the default bearer, and thus will be unable to indicate and transfer suitable QoS flow ID when transferring the packet to a core network (CN). Accordingly, the default bearer may be configured to always use the SDAP header (to always mark the QoS flow ID).

FIG. 1L is a diagram illustrating a terminal operation for processing a QoS for each IP flow in a next-generation mobile communication system according to the present disclosure.

A terminal 1l-01 may receive from a base station SDAP header configuration related indication or QoS flow ID use/nonuse indication (1l-05). As described above in the 1-1, 1-2, 1-3, and 1-4 embodiments, the SDAP header configuration related indication or the QoS flow ID use/nonuse indication may be indicated as an RRC message (RRC Connection Reconfiguration), 1-bit indicator of a PDCP header. Further, the SDAP header configuration related indication or the QoS flow ID use/nonuse indication may be indicated as 1-bit indicator of an SDAP header, or may be indicated using a PDCP control PDU or a MAC CE. If the SDAP header configuration related indication or the QoS flow ID use/nonuse indication is received, the terminal may identify whether to use the SDAP header or the QoS flow ID, identify whether the SDAP header exists from what COUNT value or what PDCP sequence number, notify the DPCP or SDAP layer through application of the result of the identification, and perform transmission end processing (use/nonuse of the SDAP header from the determined COUNT) and reception end processing (use/nonuse of the SDAP header from the determined COUNT).

If data to be transmitted to uplink is generated, the terminal identifies mapping information of corresponding IP flow, QoS flow ID, and DRB, and if the mapping information of the corresponding QoS flow ID and DRB exists and it is necessary to mark the QoS flow ID on the corresponding IP flow (or it is configured to use the corresponding SDAP header, the terminal may mark the QoS flow ID on the SDAP header, and transmit data to the corresponding DRB (1l-01). If there exists the mapping information of the corresponding QoS flow ID and the DRB and it is not necessary to mark the QoS flow ID on the corresponding IP flow (or it is not configured to use the corresponding SDAP header), the terminal may not use the SDAP header, but may transmit data to the corresponding DRB (1l-15). If there is not the corresponding QoS flow ID and DRB mapping information, the terminal may transmit the data to the default DRB. In case where the terminal sends a data packet having a QoS flow ID that is not suitable to the default bearer to the default bearer (in case where there is not DRB suitable to the QoS flow ID or the QoS flow ID value is not known), the terminal may define a special value of the QoS flow ID to indicate that a suitable DRB for this packet is necessary to the base station, or may notify the base station of this using 1-bit indicator of the PDCP header or the SDAP header.

FIG. 1M is a diagram illustrating the structure of a terminal to which an embodiment of the present disclosure can be applied.

Referring to the drawing, the terminal includes a radio frequency (RF) processor 1m-10, a baseband processor 1m-20, a storage unit 1m-30, and a controller 1m-40.

The RF processor 1m-10 may perform a function for transmitting and receiving a signal through a radio channel, such as signal band conversion and amplification. For example, the RF processor 1m-10 may perform up-conversion of a baseband signal provided from the baseband processor 1m-20 into an RF-band signal to transmit the converted signal to an antenna, and perform down-conversion of the RF-band signal received through the antenna into a baseband signal. Further, the RF processor 1m-10 may include a transmission filter, a reception filter, an amplifier, a mixer, an oscillator, a digital-to-analog converter (DAC), and an analog-to-digital converter (ADC). Although only one antenna is illustrated in the drawing, the terminal may be provided with a plurality of antennas. Further, the RF processor 1m-10 may include a plurality of RF chains. Further, the RF processor 1m-10 may perform beamforming. For the beamforming, the RF processor 1m-10 may adjust phases and sizes of signals transmitted or received through the plurality of antennas or antenna elements. Further, the RF processor may perform MIMO, and may receive several layers during performing of a MIMO operation. The RF processor 1m-10 may perform reception beam sweeping through proper configuration of the plurality of antennas or antenna elements under the control of the controller, or may control the direction and the beam width of the reception beam so that the reception beam is synchronized with the transmission beam.

The baseband processor 1m-20 may perform conversion between a baseband signal and a bit string in accordance with the physical layer standard of the system. For example, during data transmission, the baseband processor 1m-20 may generate complex symbols by encoding and modulating a transmitted bit string. Further, during data reception, the baseband processor 1m-20 may restore a received bit string by demodulating and decoding the baseband signal provided from the RF processor 1m-10. For example, in case of following an orthogonal frequency division multiplexing (OFDM) method, during data transmission, the baseband processor 1m-20 may generate complex symbols by encoding and modulating a transmitted bit string, perform mapping of the complex symbols on subcarriers, and then configure OFDM symbols through the inverse fast Fourier transform (IFFT) operation and cyclic prefix (CP) insertion. Further, during data reception, the baseband processor 1m-20 may divide the baseband signal provided from the RF processor 1m-10 in the unit of OFDM symbols, restore the signals mapped on the subcarriers through the fast Fourier transform (FFT) operation, and then restore the received bit string through demodulation and decoding.

The baseband processor 1m-20 and the RF processor 1m-10 may transmit and receive the signals as described above. Accordingly, the baseband processor 1m-20 and the RF processor 1m-10 may be called a transmitter, a receiver, a transceiver, or a communication unit. Further, in order to support different radio connection technologies, at least one of the baseband processor 1m-20 and the RF processor 1m-10 may include a plurality of communication modules. Further, in order to process signals of different frequency bands, at least one of the baseband processor 1m-20 and the RF processor 1m-10 may include different communication modules. For example, the different radio connection technologies may include an LTE network and an NR network. Further, the different frequency bands may include super high frequency (SHF) (e.g., 2.5 GHz or 5 GHz) band and millimeter wave (mmWave) (e.g., 60 GHz) band.

The storage unit 1m-30 stores therein a basic program for an operation of the terminal, application programs, and data of setup information. The storage unit 1m-30 may provide stored data in accordance with a request from the controller 1m-40.

The controller 1m-40 may control the whole operation of the terminal. For example, the controller 1m-40 may transmit and receive signals through the baseband processor 1m-20 and the RF processor 1m-10. Further, the controller 1m-40 records or reads data in or from the storage unit 1m-30. For this, the controller 1m-40 may include at least one processor. For example, the controller 1m-40 may include a communication processor (CP) performing a control for communication and an application processor (AP) controlling an upper layer, such as an application program.

FIG. 1N is a diagram illustrating a block configuration of a TRP in a wireless communication system to which an embodiment of the present disclosure can be applied.

As illustrated in the drawing, the base station may include an RF processor 1n-10, a baseband processor 1n-20, a backhaul communication unit 1n-30, a storage unit 1n-40, and a controller 1n-50.

The RF processor 1n-10 may perform a function for transmitting and receiving a signal through a radio channel, such as signal band conversion and amplification. That is, the RF processor 1n-10 may perform up-conversion of a baseband signal provided from the baseband processor 1n-20 into an RF-band signal to transmit the converted signal to an antenna, and performs down-conversion of the RF-band signal received through the antenna into a baseband signal. For example, the RF processor 1n-10 may include a transmission filter, a reception filter, an amplifier, a mixer, an oscillator, a DAC, and an ADC. Although only one antenna is illustrated in the drawing, the first connection node may be provided with a plurality of antennas. Further, the RF processor 1n-10 may include a plurality of RF chains. Further, the RF processor 1n-10 may perform beamforming. For the beamforming, the RF processor 1n-10 may adjust phases and sizes of signals transmitted or received through the plurality of antennas or antenna elements. Further, the RF processor may perform down MIMO operation through transmission of one or more layers.

The baseband processor 1n-20 may perform conversion between a baseband signal and a bit string in accordance with the physical layer standard of the first radio connection technology. For example, during data transmission, the baseband processor 1n-20 may generate complex symbols by encoding and modulating a transmitted bit string. Further, during data reception, the baseband processor 1n-20 may restore a received bit string by demodulating and decoding the baseband signal provided from the RF processor 1n-10. For example, in case of following an OFDM method, during data transmission, the baseband processor 1n-20 may generate complex symbols by encoding and modulating a transmitted bit string, perform mapping of the complex symbols on subcarriers, and then configure OFDM symbols through the IFFT operation and CP insertion. Further, during data reception, the baseband processor 1n-20 may divide the baseband signal provided from the RF processor 1n-10 in the unit of OFDM symbols, restore the signals mapped on the subcarriers through the FFT operation, and then restore the received bit string through demodulation and decoding. The baseband processor 1n-20 and the RF processor 1n-10 transmit and receive the signals as described above. Accordingly, the baseband processor 1n-20 and the RF processor 1n-10 may be called a transmitter, a receiver, a transceiver, or a wireless communication unit.

The communication unit 1n-30 may provide an interface for performing communication with other nodes in the network.

The storage unit 1n-40 stores therein a basic program for an operation of the main base station, application programs, and data of setup information. In particular, the storage unit 1n-40 may store information on a bearer allocated to the connected terminal and the measurement result reported from the connected terminal. Further, the storage unit 1n-40 may store information that becomes a basis of determination whether to provide or suspend a multi-connection to the terminal. Further, the storage unit 1n-40 may provide stored data in accordance with a request from the controller 1n-50.

The controller 1n-50 may control the whole operation of the main base station. For example, the controller 1n-50 may transmit and receive signals through the baseband processor 1n-20 and the RF processor 1n-10 or through the backhaul communication unit 1n-30. Further, the controller 1n-50 records or reads data in or from the storage unit 1n-40. For this, the controller 1n-50 may include at least one processor.

Second Embodiment

Hereinafter, the operation principle of the present disclosure will be described in detail with reference to the accompanying drawings. In describing the present disclosure, related well-known functions or configurations incorporated herein are not described in detail in case where it is determined that they obscure the subject matter of the present disclosure in unnecessary detail. Further, terms to be described later are terms defined in consideration of their functions in the present disclosure, but may differ depending on intentions of a user and an operator or customs. Accordingly, they should be defined based on the contents of the whole description of the present disclosure.

Hereinafter, terms for identifying a connection node, terms for calling network entities, terms for calling messages, terms for calling an interface between network entities, and terms for calling various pieces of identification information, as used in the following description, are exemplified for convenience in explanation. Accordingly, the present disclosure is not limited to the terms to be described later, but other terms for calling subjects having equal technical meanings may be used.

Hereinafter, for convenience in explanation, terms and titles that are defined in the $3^{rd}$ generation partnership project long term evolution (3GPP LTE) standards that are the latest standards among currently existing communication standards are used in the present disclosure. However, the present disclosure is not limited by the terms and titles, but can be equally applied to systems following other standards. In particular, the present disclosure may be applied to a 3GPP new radio (NR: $5^{th}$ generation mobile communication standards).

FIG. 2A is a diagram illustrating the structure of an LTE system for reference to explain the present disclosure.

Referring to FIG. 2A, a wireless communication system is composed of several ENBs 2a-05, 2a-10, 2a-15, and 2a-20, a mobility management entity (MME) 2a-25, and a serving-gateway (S-GW) 2a-30. User equipment (hereinafter referred to as "UE" or "terminal") 2a-35 accesses to an external network through the ENBs 2a-05, 2a-10, 2a-15, and 2a-20 and the S-GW 2a-30.

The ENBs 2a-05, 2a-10, 2a-15, and 2a-20 are access nodes of a cellular network, and provide radio accesses to the UEs accessing the network. That is, the ENBs 2a-05, 2a-10, 2a-15, and 2a-20 support connections between the UEs and a core network (CN) by performing scheduling through consolidation of state information, such as a buffer state, an available transmission power state, and a channel state of each UE, in order to service users' traffics. The MME 2a-25 is a device that takes charge of not only mobility management of the terminal 2a-35 but also various kinds of control functions, and is connected to the plurality of eNBs. The S-GW 2a-30 is a device that provides a data bearer. Further, the MME 2a-25 and the S-GW 2a-30 may further perform authentication of the UE accessing to the network and bearer management, and process packets arriving from the eNBs 2a-05, 2a-10, 2a-15, and 2a-20, or process packets to be transferred to the eNBs 2a-05, 2a-10, 2a-15, and 2a-20.

FIG. 2B is a diagram illustrating a radio protocol structure of an LTE system for reference to explain the present disclosure. Although an NR to be defined in future may have a radio protocol structure that is partially different from the radio protocol structure in the drawing, such a radio protocol structure will be described for convenience in illustrating the present disclosure.

Referring to FIG. 2B, in UE or an ENB, a radio protocol of an LTE system is composed of a packet data convergence protocol (PDCP) 2b-05 or 2b-40, a radio link control (RLC) 2b-10 or 2b-35, and a medium access control (MAC) 2b-15 or 2b-30. The packet data convergence protocol (PDCP) 2b-05 or 2b-40 takes charge of IP header compression/decompression operations, and the radio link control (hereinafter referred to as "RLC") 2b-10 or 2b-35 reconfigures a PDCP packet data unit (PDU) with a proper size. The MAC 2b-15 or 2b-30 is connected to several RLC layer devices configured in one terminal, and performs multiplexing/demultiplexing of RLC PDUs into/from a MAC PDU. The physical layer 2b-20 or 2b-25 performs channel coding and modulation of upper layer data to make and transmit OFDM symbols to a radio channel, or performs demodulation and channel decoding of the OFDM symbols received on the radio channel to transfer the demodulated and channel-decoded symbols to an upper layer. Further, even the physical layer uses a hybrid ARQ (HARQ) for additional error correction, and a reception end transmits whether to receive the packet transmitted from a transmission end by 1 bit. This is called HARQ ACK/NACK information. HARQ ACK/NACK information for uplink transmission may be transmitted through a physical hybrid-ARQ indicator channel (PHICH), and uplink HARQ ACK/NACK information for downlink transmission may be transmitted through a physical uplink control channel (PUCCH) or a physical uplink shared channel (PUSCH). The PUCCH is used for the terminal to transfer not only the HARQ ACK/NACK information but also downlink channel status information (CSI) and scheduling request (SR) to the base station. If the terminal transmits the SR that is 1-bit information to a resource in the PUCCH configured by the base station, the base station recognizes that the corresponding terminal has data to be sent to an uplink, and allocates an uplink resource. Through the uplink resource, the terminal may transmit a detailed buffer status report (BSR) message. The base station may allocate a plurality of SR resources to one terminal.

On the other hand, the PHY layer may be composed of one or a plurality of frequencies/carriers, and a technology for one base station to simultaneously configure and use a plurality of frequencies is called carrier aggregation (hereinafter referred to as "CA"). The CA technology is to additionally use one primary carrier or a plurality of secondary carriers in addition to one carrier used for communication between the terminal (or user equipment (UE)) and the base station (E-UTRAN NodeB (eNB)) to greatly increase throughput as much as the number of secondary carriers. On the other hand, in LTE, a cell in a base station using a primary carrier is called a primary cell (PCell), and a cell using a secondary carrier is called s secondary cell (SCell). A technology to extend the CA function to two base stations is called dual connectivity (hereinafter referred to as "DC"). In the DC technology, the terminal simultaneously connects and uses a master base station (master E-UTRAN NodeB (hereinafter referred to as "MeNB")) and a secondary base station (secondary E-UTRAN NodeB (hereinafter referred to as "SeNB")). Cells belonging to the master base station are called a master cell group (hereinafter referred to as "MCG"), and cells belonging to the secondary base station are called a secondary cell group (hereinafter referred to as "SCG"). Each cell group has a representative cell, and the representative cell of the master cell group is called a primary cell (hereinafter referred to as "PCell"), and the representative cell of the secondary cell group is called a primary secondary cell (hereinafter referred to as "PSCell"). In case of using the above-described NR, since the MCG uses the LTE technology and the SCG uses the NR, the terminal can simultaneously use the LTE and the NR.

Although not illustrated in the drawing, a radio resource control (hereinafter referred to as "RRC") layer exists above the PDCP layers of the terminal and the base station, and the RRC layer may send/receive connection and measurement related configuration control messages for the radio resource control. For example, the terminal may be instructed to perform measurement using the RRC layer message, and the terminal may report the result of measurement to the base station using the RRC layer message.

FIG. 2C is a diagram illustrating the 2-1 embodiment for a message flow between a terminal and a base station when a method for transmitting a scheduling request is used.

In the exemplary drawing, a terminal 2c-01 in an idle mode (RRC_IDLE) may perform an access to a base station by the reason of occurrence of data to be sent (2c-11). In the idle mode, the terminal 2c-01 is not connected to a network for power saving, and thus is in a state where it is unable to transmit the data. For data transmission, it is necessary for the terminal 2c-01 to be shifted to a connection mode (RRC_CONNECTED). If the terminal 2c-01 succeeds in a connection procedure to the base station 2c-03, the terminal 2c-01 is shifted to the connection mode (RRC_CONNECTED), and the terminal 2c-01 in the connection mode can perform data transmission/reception with the base station 2c-03 through security activation and bearer configuration for the data to be described later.

Thereafter, the base station 2c-03 may configure a data radio bearer (DRB) that serves as a logical path for data transmission to the terminal 2c-01, and transmit an SR resource for requesting an uplink resource and related configuration information (2c-13). The base station 2c-03 may configure a plurality of periodic SR resources to the terminal 2c-01, and allocate one of two kinds of SR resources in accordance with the SR usage method. For example, a first SR resource is an SR resource used in case where a general BSR is triggered, and a second SR resource is an SR resource used in case where data is generated in traffics of specific logical channels (or DRBs) configured by the base station 2c-03 through the RRC message. In case of the second SR resource, it may be used when the terminal 2c-01 requests a transmission resource for a specific logical channel (e.g., logical channel for an ultra-reliable low latency communication (URLLC) service), and the base station 2c-03 having received the SR as the second SR resource may recognize that a specific logical channel (e.g., URLLC related) traffic has occurred in the terminal 2c-01, and allocate, for example, a transmission resource for the URLLC to the terminal 2c-01. For example, the transmission resource for the URLLC may mean a resource having a short transmission length or wide subcarrier spacing. Accordingly, the RRC message may include at least one of time/frequency/code/numerology/transmission time interval (TTI) length information of PUCCH resources for SR transmission to the first SR resource, and may include at least one of time/frequency/code/numerology/TTI length information of PUCCH resources for SR transmission to the second SR resource and a logical channel identification list mapped (or linked/connected) to the second SR resource.

The base station 2c-03 may transmit the various kinds of measurement configurations to the terminal 2c-01 using an RRCConnectionReconfiguration message of the RRC layer. Thereafter, the terminal 2c-01 may transmit an identification message for the configuration indication (2c-15), and the identification message may use an RRCConnectionReconfigurationComplete message of the RRC layer.

On the other hand, the terminal 2c-01 triggers a current buffer status report (BSR) of the terminal 2c-01 in accordance with various conditions below, and the BSR may be divided as follows in accordance with the transmission triggering condition.

First type: Regular BSR
  BSR that is transmitted if a BSR retransmission timer (retxBSR-Timer) has expired in case where the terminal has data transmittable with respect to a certain logical channel/radio bearer (RB) belonging to a logical channel group (hereinafter referred to as "LCG")
  BSR that is transmitted in case where data to be transmitted from an upper layer (RLC or PDCP layer) is generated with respect to a logical channel/radio bearer belonging to the LCG, and this data has a higher priority than the priority of a logical channel/radio bearer belonging to a certain LCG
  BSR that is transmitted in case where data to be transmitted from an upper layer (RLC or PDCP layer) is generated with respect to a logical channel/radio bearer belonging to the LCG, and except for this data, there is no data even in any LCG
Second type: Periodic BSR
  BSR that is transmitted if a periodic BSR timer (periodicBSR-Timer) configured to the terminal has expired
Third type: Padding BSR
  BSR that is transmitted if an uplink resource is allocated, and padding bits occupying a space remaining after data transmission is equal to or larger than a sum of the size of BSR MAC CE and the size of a sub-header of the BSR MAC CE
  If there are packets in buffers of a plurality of LCGs, truncated BSR is transmitted.

If a regular BSR is generated in accordance with the above-described condition, the terminal 2c-01 may trigger transmission of an SR through the first SR resource to transmit the SR (2c-19). If traffic occurs in a specific logical channel configured in the RRC message, the terminal 2c-01 may trigger transmission of the SR through the second SR resource, and transmit the SR on the corresponding resource (2c-19).

Although not illustrated in the drawing, if the SR is triggered as described above, the SR triggering may be canceled before the SR is transmitted or retransmitted. For example, in case of the SR to be transmitted on the first SR resource, the SR may be canceled when a MAC PDU reporting the latest buffer status report is generated. In case of the SR to be transmitted on the second SR resource, the corresponding SR may be canceled when an uplink resource for a specific configured logical channel is allocated (e.g., when uplink resource grant is received).

If the resource for the BSR is unable to be received from the base station for a specific time, the terminal 2c-01 may retransmit the SR (2c-21). The above-described reason may correspond to a case where many terminals 2c-01 coexist and there is no remaining power to give the uplink resource to the corresponding terminal 2c-01 or a case where the base station 2c-03 is unable to properly receive the SR transmission. In case of the above-described retransmission, a counter for counting the number of times of retransmission may be driven, and respective count values may be managed for the first SR transmission and the second SR transmission. If one of two count values reaches the maximum number of times configured through the RRC message, although not illustrated in the drawing, transmission of a specific MAC control element (CE) can be triggered, and the MAC CE may include information indicating which of the first SR transmission and the second SR transmission has failed.

In a state where one of the first SR and the second SR is triggered (i.e., in a state where transmission is pending), the other thereof may be triggered, and if transmission of the two SRs overlap each other in time, the terminal 2c-01 may preferentially transmit the second SR. Or, the terminal 2c-01 may transmit one of the first SR and the second SR resources that is first possible in time. Further, if they do not overlap each other in time, the terminal 2c-01 may transmit both the first SR and the second SR.

The base station 2c-03 having received the SR may grasp for what reason the terminal has transmitted the SR in accordance with the receive SR resource. Accordingly, the base station 2c-03 may determine what uplink resource is to be allocated accordingly (2c-23), and allocate the uplink transmission resource (2c-25). In the drawing, a scenario is illustrated, in which the terminal 2c-01 transmits a BSR to a resource allocated by the base station 2c-03 (2c-27), and accordingly, the terminal 2c-01 transmits uplink data (2c-35) on the uplink transmission resource additionally allocated by the base station (2c-33). However, if the base station 2c-03 receives the SR on the second SR resource (2c-25), the base station 2c-03 may immediately allocate the uplink resource having a size enough to transmit the data to the terminal 2c-01 (2c-33), and thus the terminal 2c-01 can immediately transmit the data on the corresponding resource (2c-35).

FIG. 2D is a diagram illustrating the 2-1 embodiment for an operation order of a terminal when a method for transmitting a scheduling request is used.

Referring to FIG. 2D, it is assumed that a terminal is connected to an LTE base station and is in a connection mode (RRC_CONNECTED) (2d-01). Thereafter, the terminal may receive configuration of a DRB from the base station. Further, the terminal may receive an SR resource for an uplink resource request and related configuration information, and transmit a corresponding identification message (2d-03). In the configuration message, the base station may configure a plurality of periodic SR resources to the terminal, and allocate one of two kinds of SR resources in accordance with an SR usage method. For example, the first SR resource may be an SR resource used in case where a general BSR is triggered, and a second SR resource may be an SR resource used in case where data is generated in traffics of specific logical channels (or DRBs) configured by the base station through the RRC message. Specifically, in case of the second SR resource, it may be used when the terminal requests a transmission resource for a specific logical channel, and the base station having received the SR as the second SR resource recognizes that a specific logical channel (e.g., URLLC related) traffic has occurred in the terminal, and allocates, for example, a transmission resource for the URLLC to the terminal. The transmission resource for the URLLC may mean a resource having a short transmission length or wide subcarrier spacing. Accordingly, the RRC message may include at least one of time/frequency/code/numerology/transmission time interval (TTI) length information of PUCCH resources for SR transmission to the first SR resource, and may include at least one of time/frequency/code/numerology/TTI length information of PUCCH resources for SR transmission to the second SR resource and a logical channel identification list mapped (or linked/connected) to the second SR resource. The configuration message may be transmitted using an RRCConnectionReconfiguration message of the RRC layer, and an identification message may use an RRCConnectionReconfigurationComplete message of the RRC layer.

On the other hand, the terminal triggers a current buffer status report (BSR) of the terminal in accordance with various conditions below, and the BSR may be divided as follows in accordance with the transmission triggering condition.

First type: Regular BSR
    BSR that is transmitted if a BSR retransmission timer (retxBSR-Timer) has expired in case where the terminal has data transmittable with respect to a certain logical channel/radio bearer (RB) belonging to a logical channel group (hereinafter referred to as "LCG")
    BSR that is transmitted in case where data to be transmitted from an upper layer (RLC or PDCP layer) is generated with respect to a logical channel/radio bearer belonging to the LCG, and this data has a higher priority than the priority of a logical channel/radio bearer belonging to a certain LCG
    BSR that is transmitted in case where data to be transmitted from an upper layer (RLC or PDCP layer) is generated with respect to a logical channel/radio bearer belonging to the LCG, and except for this data, there is no data even in any LCG Second type: Periodic BSR
    BSR that is transmitted if a periodic BSR timer (periodicBSR-Timer) configured to the terminal has expired Third type: Padding BSR
    BSR that is transmitted if an uplink resource is allocated, and padding bits occupying a space remaining after data transmission is equal to or larger than a sum of the size of BSR MAC CE and the size of a sub-header of the BSR MAC CE If there are packets in buffers of a plurality of LCGs, truncated BSR is transmitted.

If a regular BSR is generated in accordance with the above-described condition, the terminal may trigger transmission of an SR through the first SR resource (2d-05) to transmit the SR (2d-07). If traffic occurs in a specific logical channel configured in the RRC message, the terminal may trigger transmission of the SR through the second SR resource (2d-05), and transmit the SR on the corresponding resource (2d-07).

If the resource for the BSR is unable to be received from the base station for a specific time, (2d-09), or if the number of times of transmission of the corresponding SR does not reach the maximum number of times (2d-11), the terminal may retransmit the corresponding SR (2d-07). The above-described reason may correspond to a case where many terminals coexist and there is no remaining power to give the uplink resource to the corresponding terminal or a case where the base station is unable to properly receive the SR transmission. The count values for the number of times of transmission may be managed for the first SR transmission and the second SR transmission. If one of two count values reaches the maximum number of times configured through the RRC message, the terminal may request the uplink resource from the base station by performing a random access procedure, and may perform transmission of a BSR and a specific MAC CE on the corresponding resource. The specific MAC CE may include information indicating which of the first SR transmission and the second SR transmission has failed (2d-15).

In a state where one of the first SR and the second SR is triggered (e.g., in a state where transmission is pending), the other thereof may be triggered, and if transmission of the two SRs overlap each other in time, the second SR may be preferentially transmitted, or one of the first SR and the second SR resources that is first possible in time may be transmitted. Further, if they do not overlap each other in time, both the first SR and the second SR may be transmitted.

If the terminal transmits the first SR, or receives the uplink resource from the base station although it does not transmit the SR, the terminal may notify of the buffer state of the terminal through transmission of the BSR (2d-13). Accordingly, the existing triggered SR may be canceled. Further, if the uplink resource received from the base station is an uplink resource for a specific logical channel (i.e., if a specific numerology or a specific indicator in the uplink resource allocation is included), the corresponding SR may be canceled.

FIG. 2E is a diagram illustrating the 2-2 embodiment for a message flow between a terminal and a base station when a method for transmitting a scheduling request is used.

In the exemplary drawing, a terminal 2e-01 in an idle mode (RRC_IDLE) may perform an access to a base station 2e-03 by the reason of occurrence of data to be sent (2e-11). In the idle mode, the terminal 2e-01 is not connected to a network for power saving, and thus is in a state where it is unable to transmit the data. For data transmission, it is necessary for the terminal to be shifted to a connection mode (RRC_CONNECTED). If the terminal 2e-01 has succeeded in a connection procedure to the base station (2e-03), the terminal 2e-01 may be shifted to the connection mode (RRC_CONNECTED). The terminal 2e-01 in the connection mode can perform data transmission/reception with the base station 2e-03 through security activation and bearer configuration for the data to be described later.

Thereafter, the base station 2e-03 may configure a data radio bearer (DRB) that serves as a logical path for data transmission, and transmit an SR resource for requesting an uplink resource and related configuration information (2e-13). The base station 2e-03 may configure a plurality of periodic SR resources to the terminal 2e-01, and in this embodiment, it may map respective SRs to a list of specific logical channels or a logical channel group (LCG). The logical channel group is a unit for reporting a buffer state during the BSR transmission as described above. For example, if the terminal 2e-01 has logical channels #1, #2, #3, and #4, the base station 2e-03 may configure to tie logical channels #1 and #2 into logical channel group #0 and to tie logical channels #3 and #4 into logical channel group #1. During reporting of the buffer state, the terminal 2e-01 may report to the base station the buffer state of logical channel group #0 (i.e., sum of data accumulated in buffers of logical channels #1 and #2) and the buffer state of logical channel group #1. In this case, if data exists on the logical channels #1 or/and #2, SR resource #0 is utilized, whereas if data exists on the logical channels #3 or/and #4, SR resource #1 is utilized. Accordingly, the respective SR resources may be mapped to a list of specific logical channels (LCHs) or LCG(s). Accordingly, during the triggering of the regular BSR as described above, the LCG/LCH having triggered the regular BSR may trigger the mapped SRs.

Accordingly, the RRC message may include at least one of time/frequency/code/numerology/TTI length information of PUCCH resources for SR transmission for each SR resource and LCH or LCG information mapped to the corresponding SR resource.

The base station 2e-03 may transmit the various kinds of measurement configurations to the terminal 2e-01 using an RRCConnectionReconfiguration message of the RRC layer. Thereafter, the terminal 2e-01 may transmit an identification message for the configuration indication (2e-15), and may use an RRCConnectionReconfigurationComplete message of the RRC layer.

As described above, the terminal 2e-01 triggers the current BSR of the terminal in accordance with various conditions below, and the BSR may be divided as follows in accordance with the transmission triggering condition.

First type: Regular BSR
 Condition 1: BSR that is transmitted if a BSR retransmission timer (retxBSR-Timer) has expired in case where the terminal has data transmittable with respect to a certain logical channel/radio bearer (RB) belonging to the LCG
 Condition 2: BSR that is transmitted in case where data to be transmitted from an upper layer (RLC or PDCP layer) is generated with respect to a logical channel/radio bearer belonging to the LCG, and this data has a higher priority than the priority of a logical channel/radio bearer belonging to a certain LCG
 Condition 3: BSR that is transmitted in case where data to be transmitted from an upper layer (RLC or PDCP layer) is generated with respect to a logical channel/radio bearer belonging to the LCG, and except for this data, there is no data even in any LCG
Second type: Periodic BSR
 BSR that is transmitted if a periodic BSR timer (periodicBSR-Timer) configured to the terminal has expired
Third type: Padding BSR
 BSR that is transmitted if an uplink resource is allocated, and padding bits occupying a space remaining after data transmission is equal to or larger than a sum of the size of BSR MAC CE and the size of a sub-header of the BSR MAC CE
 If there are packets in buffers of a plurality of LCGs, truncated BSR is transmitted.

In this case, if traffic occurs in the logical channel (or if traffic remains in case of retxBSR-Timer expiration), and the regular BSR has been triggered, the SR transmission mapped to the logical channel on which the corresponding regular BSR has been triggered may be triggered to transmit the SR on the corresponding resource (2e-19). For example, as for the specific SR, if the regular BSR is triggered with respect to the LCG data of a specific LCH list or the LCG data belonging to the LCG, or if LCG data having a higher priority than the priority of the LCG data being currently stored is generated, the corresponding regular BSR may be triggered (condition 2 as described above). Thereafter (2e-27), the terminal 2e-01 may report to the base station 2e-03 only the buffer state of the corresponding LCG in accordance with the triggered regular BSR, or may report buffer states of all LCGs.

Although not illustrated in the drawing, if the SR is triggered as described above, the SR triggering may be canceled before the SR is transmitted or retransmitted. For example, if the LCH/LCG mapped to the corresponding SR and the MAC PDU reporting the latest buffer status report are generated, the SR may be canceled.

If the resource for the BSR is unable to be received from the base station for a specific time, the terminal may retransmit the SR (2e-21). The above-described reason may correspond to a case where many terminals coexist and there is no remaining power to give the uplink resource to the corresponding terminal or a case where the base station is unable to properly receive the SR transmission. In case of the above-described retransmission, a counter for counting the number of times of retransmission is driven, and respective count values may be managed for each SR. If one of two count values reaches the maximum number of times configured through the RRC message, all SRs are canceled, and the BSR may be transmitted to the base station through random access triggering.

In a state where one of the plurality of configured SRs is triggered to be in a pending state, another SR may be triggered, and if transmissions of the two SRs overlap each other in a time domain, the SR designated in the RRC message (or having high SR identifier) may be preferentially transmitted. Further, if they do not overlap each other, all of them may be transmitted.

The base station 2e-03 having received the SR may grasp for what LCH/LCG of the terminal 2e-01 the SR has been triggered in accordance with the receive SR resource, determine what uplink resource is to be allocated accordingly (2e-23), and allocate the uplink transmission resource (2e-25). In the drawing, a scenario is illustrated, in which the terminal 2e-01 transmits a BSR to a resource allocated by the base station 2e-03 (2e-27), and thus the terminal 2e-01 transmits uplink data (2e-35) on the uplink transmission resource additionally allocated by the base station 2e-03 (2e-33). However, if the base station 2e-03 receives the SR on the second SR resource (2e-25), the base station 2e-03 may immediately allocate the uplink resource having a size enough to transmit the data to the terminal 2e-01 (2e-33), and thus the terminal 2e-01 can immediately transmit the data on the corresponding resource (2e-35). In particular, if the mapped LCG includes LCHs having high priority or being sensitive to a delay, the latter method may be used.

FIG. 2F is a diagram illustrating the 2-2 embodiment for an operation order of a terminal when a method for transmitting a scheduling request is used.

Referring to FIG. 2F, it is assumed that a terminal is connected to an LTE base station and is in a connection mode (RRC_CONNECTED) (2f-01). Thereafter, the terminal may receive configuration of a DRB from the base station, receive an SR resource for an uplink resource request and related configuration information, and transmit a corresponding identification message (2f-03). In the configuration message, the base station may configure a plurality of periodic SR resources to the terminal. In this embodiment, respective SR resources may be mapped to a list of specific logical channels or LCGs. Accordingly, during triggering of the regular BSR as described above, the LCG/LCH having triggered the regular BSR may trigger the mapped SRs. The configuration information may include at least one of time/frequency/code/numerology/TTI length information of PUCCH resources for SR transmission for each SR resource and LCH or LCG information mapped to the corresponding SR resources.

The configuration information may be received using an RRCConnectionReconfiguration message of the RRC layer, and the identification message may use an RRCConnectionReconfigurationComplete message of the RRC layer.

As described above, the terminal triggers the current BSR of the terminal in accordance with various conditions below, and the BSR may be divided as follows in accordance with the transmission triggering condition.

First type: Regular BSR
  Condition 1: BSR that is transmitted if a BSR retransmission timer (retxBSR-Timer) has expired in case where the terminal has data transmittable with respect to a certain logical channel/radio bearer (RB) belonging to the LCG
  Condition 2: BSR that is transmitted in case where data to be transmitted from an upper layer (RLC or PDCP layer) is generated with respect to a logical channel/radio bearer belonging to the LCG, and this data has a higher priority than the priority of the logical channel/radio bearer belonging to a certain LCG
  Condition 3: BSR that is transmitted in case where data to be transmitted from an upper layer (RLC or PDCP layer) is generated with respect to a logical channel/radio bearer belonging to the LCG, and except for this data, there is no data even in any LCG
Second type: Periodic BSR
  BSR that is transmitted if a periodic BSR timer (periodicBSR-Timer) configured to the terminal has expired
Third type: Padding BSR
  BSR that is transmitted if an uplink resource is allocated, and padding bits occupying a space remaining after data transmission is equal to or larger than a sum of the size of a BSR MAC CE and the size of a sub-header of the BSR MAC CE
  If there are packets in buffers of a plurality of LCGs, truncated BSR is transmitted.

The terminal may determine whether traffic occurs (or if traffic remains in case of retxBSR-Timer expiration) in the corresponding logical channel list/LCG for each configured logical channel list/LCG and the regular BSR has been triggered (2f-05). If the regular BSR has been triggered, the terminal may transmit the SR on the corresponding SR resource by triggering the SR transmission mapped to the logical channel on which the corresponding regular BSR has been triggered (2f-07). For example, as for the specific SR, if the regular BSR is triggered with respect to the LCH data of a specific LCH list or the LCH data belonging to the LCG, or if LCG data having a higher priority than the priority of the LCG data being currently stored is generated, the corresponding regular BSR may be triggered (condition 2 as described above).

If the resource for the BSR is unable to be received from the base station for a specific time (2f-09), the terminal may retransmit the SR (2f-11). The above-described reason may correspond to a case where many terminals coexist and there is no remaining power to give the uplink resource to the corresponding terminal or a case where the base station is unable to properly receive the SR transmission. In case of the above-described retransmission, a counter for counting the number of times of retransmission may be driven, and respective count values may be managed for each SR. If one of two count values reaches the maximum number of times configured through the RRC message (2f-11), all SRs may be canceled, and the BSR may be transmitted to the base station through random access triggering (2f-15).

In a state where one of the plurality of configured SRs is triggered to be in a pending state, another SR may be triggered, and if transmissions of the two SRs overlap each other in a time domain, the terminal may preferentially transmit the SR designated in the RRC message (or having a higher SR identifier). Further, if they do not overlap each other, the terminal may transmit all of triggered SRs.

If the uplink resource is received from the base station (2f-09), the terminal may report to the base station only the buffer state of the corresponding LCG in accordance with the triggered regular BSR, or may report buffer states of all LCGs (2f-13). Accordingly, the terminal may cancel the SR if the LCH/LCG mapped to the corresponding SR and the MAC PDU reporting the latest buffer status report are generated.

FIG. 2G is a diagram illustrating the 2-3 embodiment for a message flow between a terminal and a base station when a method for transmitting a scheduling request is used.

In the exemplary drawing, a terminal 2g-01 in an idle mode (RRC_IDLE) may perform an access to a base station by the reason of occurrence of data to be sent (2g-11). In the idle mode, the terminal 2g-01 is not connected to a network for power saving, and thus is in a state where it is unable to transmit the data. For data transmission, it is necessary for the terminal 2g-01 to be shifted to a connection mode (RRC_CONNECTED). If the terminal 2g-01 succeeds in a connection procedure to the base station 2g-03, the terminal 2g-01 may be shifted to the connection mode (RRC_CONNECTED), and the terminal 2g-01 in the connection mode can perform data transmission/reception with the base station 2g-03 through security activation and bearer configuration for the data to be described later.

Thereafter, the base station 2g-03 may configure a DRB to the terminal 2g-01, and transmit an SR resource for requesting an uplink resource and related configuration information (2g-13). The base station 2g-03 may configure a plurality of periodic SR resources to the terminal 2g-01, and in this embodiment, a regular BSR triggers the SR, and the SR to be transmitted may be determined in accordance with the contents (LCH) reported by the regular BSR. Accordingly, during the respective SR configuration, respective SRs and specific logical channel(s) may be configured together. In this embodiment, if the BSR reports specific SR and BS of the configured (or connected) LCH (or if the regular BSR is triggered by the connected LCH), the corresponding SR may be triggered. During the BSR triggering, if there is no LCH configured/connected to the SR, a default SR may be triggered. For example, the base station may configure 3 SRs to the terminal, and if SR #1 is mapped to LCH x and LCH y, SR #2 is mapped to LCH z, and SR #3 has no mapping, or if traffic occurs with respect to LCH w, the terminal may trigger SR #3 (since the BSR has been triggered due to the LCH having no mapping).

Accordingly, the RRC message may include at least one of time/frequency/code/numerology/TTI length information of PUCCH resources for SR transmission for each SR resource and LCH or LCG information mapped to the corresponding SR resource.

In this exemplary drawing, a case where SR #1 is preferentially configured and the corresponding SR has no mapping is preferentially illustrated.

The base station 2g-03 may transmit the various kinds of measurement configurations to the terminal 2g-01 using an RRCConnectionReconfiguration message of the RRC layer. Thereafter, the terminal 2g-01 may transmit an identification message for the configuration indication (2g-15), and the identification message may use an RRCConnectionReconfigurationComplete message of the RRC layer.

Accordingly, if uplink data is generated, the BSR may be triggered in accordance with the above-described regular BSR triggering condition (2g-17), the terminal may select SR #1 since a specific SR is not currently connected (2g-19), and may transmit the corresponding SR #1 (21g-21).

Accordingly, the terminal 2g-01 may be allocated with uplink transmission resource from the base station 2g-23, and may generate the BSR to be transmitted on the corresponding resource. Further, the terminal 2g-01 may receive the BSR in a MAC PDU, cancel the triggered SR (2g-25), and transmit the generated BSR (2g-27).

Thereafter, in this embodiment, the base station 2g-03 may be additionally configured with SR #2, and map the corresponding SR #2 to a specific LCH (in this embodiment, LCH x) (2g-33). The terminal 2g-01 may transmit a corresponding identification message (2g-35).

Thereafter, the uplink data may be generated in the terminal 2g-01, and the regular BSR may be triggered (2g-37). In this case, the terminal 2g-01 may determine whether a BSR for what logical channel has occurred. If the BS of the configured LCH x (or BS of the LCH to which LCH x belongs) is reported, the terminal 2g-01 may select SR #2, whereas if not, it may select SR #1 (2g-39).

Accordingly, the selected SR may be transmitted to the base station 2g-03 (2g-41), and the uplink transmission resource may be allocated from the base station 2g-03 (2g-43). The terminal 2g-01 may generate the BSR in accordance with the reception of the uplink transmission resource, contain the corresponding BSR in the MAC PDU, and cancel the triggered SR (2g-45). Further, the terminal 2g-01 transmits the generated BSR on the allocated resource (2g-47).

In the same manner as other embodiments as described above, the terminal 2g-01 may be configured the maximum number of times of transmission with respect to the SR. However, in this embodiment, one count value can be maintained even in case where the plurality of SRs have been configured, and the corresponding count value can be increased even in case of transmitting different SRs. Further, in case where the SR has already been triggered, another SR may not be triggered, but the first triggered SR may be continuously used. Further, if the SR having a higher priority is configured, or if the SR having a higher priority is triggered in accordance with the BSR report contents later, the corresponding SR having the higher priority may be switched.

If the SR is still pending although the SR has been transmitted as many as the maximum number of times of transmission, the terminal 2g-01 may trigger a random access. The SR transmission may fail since the SR does not perform an operation of additionally heightening transmission power every retransmission. Accordingly, if the SR has failed (2g-51), the terminal 2g-01 generates a control message for reporting what SR has failed. The control message may contain the contents on what SR has failed. For example, the terminal 2g-01 can know from the control message that transmission of SR #1, SR #2, or both of them have failed. Accordingly, the terminal 2g-01 may transmit the BSR and the corresponding message through the triggering of the random access (2g-53). If the SR transmission has failed as described above, the terminal 2g-01 may deactivate all configured SRs, or may determine SR configuration to be deactivated in accordance with the priority. For example, if a failure has occurred in a certain SR in a state where the priority is configured in the order of SR #1>SR #2>SR #3, the terminal 2g-01 may deactivate or disable only the SRs having the priorities lower than that of the corresponding SR.

Further, if retxBSR-Timer expires among the regular BSR generation conditions (condition 1 as described above), the terminal 2g-01 may trigger a specific SR (SR #1 in the exemplary drawing) configured by the base station through the RRC message, or may trigger the SR mapped to the logical channel of the currently remaining data (2g-55).

FIG. 2H is a diagram illustrating the 2-3 embodiment for an operation order of a terminal when a method for transmitting a scheduling request is used.

Referring to FIG. 2H, it is assumed that a terminal is connected to an LTE base station and is in a connection mode (RRC_CONNECTED) (2h-01). Thereafter, the terminal may receive configuration of a DRB from the base station, receive an SR resource for an uplink resource request and related configuration information, and transmit a corresponding identification message (2h-03). In the configuration message, the base station may configure a plurality of periodic SR resources to the terminal, and in this embodiment, it may map respective SR resources to a list of specific logical channels or LCGs. Accordingly, during triggering of the regular BSR as described above, the LCG/LCH having triggered the regular BSR may trigger the mapped SRs. The configuration information may include at least one of time/frequency/code/numerology/TTI length information of PUCCH resources for SR transmission for each SR resource and LCH or LCG information mapped to the corresponding SR resources.

The configuration information may be received using an RRCConnectionReconfiguration message of the RRC layer, and the identification message may use an RRCConnectionReconfigurationComplete message of the RRC layer.

As described above, the terminal triggers the current BSR of the terminal in accordance with various conditions below, and the BSR may be divided as follows in accordance with the transmission triggering condition.

First type: Regular BSR
Condition 1: BSR that is transmitted if a BSR retransmission timer (retxBSR-Timer) has expired in case where the terminal has data transmittable with respect to a certain logical channel/radio bearer (RB) belonging to the LCG
Condition 2: BSR that is transmitted in case where data to be transmitted from an upper layer (RLC or PDCP layer) is generated with respect to a logical channel/radio bearer belonging to the LCG, and this data has a higher priority than the priority of the logical channel/radio bearer belonging to a certain LCG
Condition 3: BSR that is transmitted in case where data to be transmitted from an upper layer (RLC or PDCP layer) is generated with respect to a logical channel/radio bearer belonging to the LCG, and except for this data, there is no data even in any LCG
Second type: Periodic BSR
BSR that is transmitted if a periodic BSR timer (periodicBSR-Timer) configured to the terminal has expired
Third type: Padding BSR
BSR that is transmitted if an uplink resource is allocated, and padding bits occupying a space remaining after data transmission is equal to or larger than a sum of the size of a BSR MAC CE and the size of a sub-header of the BSR MAC CE
If there are packets in buffers of a plurality of LCGs, truncated BSR is transmitted.

In this case, the terminal may determine whether traffic occurs (or if traffic remains in case of retxBSR-Timer expiration) in the configured logical channel among all logical channels and the regular BSR has been triggered (2h-05), and the SR transmission mapped to the logical channel on which the corresponding regular BSR has been triggered may be triggered to transmit the SR on the corresponding SR resource (2h-07). For example, the base station may configure 3 SRs to the terminal, and if SR #1 is mapped to LCH x and LCH y, SR #2 is mapped to LCH z, and SR #3 has no mapping, or if traffic occurs with respect to LCH w, the terminal may trigger SR #3 (since the BSR has been triggered due to the LCH having no mapping), select the SR #3 resource, and transmit the SR (2h-07).

If the resource for the BSR is unable to be received from the base station for a specific time (2h-09), the terminal may retransmit the SR (2h-11). The above-described reason may correspond to a case where many terminals coexist and there is no remaining power to give the uplink resource to the corresponding terminal or a case where the base station is unable to properly receive the SR transmission. In case of the above-described retransmission, a counter for counting the number of times of retransmission is driven, respective count values may be managed for each SR, or one count value may be integrally managed. If the count value reaches the maximum number of times configured through the RRC message (2h-11), the terminal may cancel all SRs, perform random access triggering to transmit the BSR to the base station. Further, the terminal may include and transmit an RRC layer message for notifying what SR the failed SR is (2h-15).

If another SR is triggered in a state where one of the plurality of configured SRs is triggered to be in a pending state, the terminal may continuously transmit the existing first triggered SR as it is, and if the SR having high priority is generated in accordance with the SBR contents, the terminal may switch the SR resource (2h-05), and perform the SR transmission on the corresponding SR resource (2h-07).

If the uplink resource is received from the base station (2h-09), the terminal may report the buffer state of the terminal to the base station (2h-13). Accordingly, the terminal may cancel the corresponding triggered SR if the MAC PDU reporting the latest buffer status report is generated.

FIG. 2I is a diagram illustrating the block configuration of a terminal according to an embodiment of the present disclosure.

Referring to FIG. 2I, the terminal may include a radio frequency (RF) processor 2i-10, a baseband processor 2i-20, a storage unit 2i-30, and a controller 2i-40.

The RF processor 2i-10 may perform a function for transmitting and receiving a signal through a radio channel, such as signal band conversion and amplification. For example, the RF processor 2i-10 may perform up-conversion of a baseband signal provided from the baseband processor 2i-20 into an RF-band signal to transmit the converted signal to an antenna, and perform down-conversion of the RF-band signal received through the antenna into a baseband signal. For example, the RF processor 2i-10 may include a transmission filter, a reception filter, an amplifier, a mixer, an oscillator, a digital-to-analog converter (DAC), and an analog-to-digital converter (ADC). Although only one antenna is illustrated in FIG. 2E, the terminal may be provided with a plurality of antennas. Further, the RF processor 2i-10 may include a plurality of RF chains. Further, the RF processor 2i-10 may perform beamforming. For the beamforming, the RF processor 2i-10 may adjust phases and sizes of signals transmitted or received through the plurality of antennas or antenna elements.

The baseband processor 2i-20 may perform conversion between a baseband signal and a bit string in accordance with the physical layer standard of the system. For example, during data transmission, the baseband processor 2i-20 may generate complex symbols by encoding and modulating a transmitted bit string. Further, during data reception, the baseband processor 2i-20 may restore a received bit string by demodulating and decoding the baseband signal provided from the RF processor 2i-10. For example, in case of following an orthogonal frequency division multiplexing (OFDM) method, during data transmission, the baseband processor 2i-20 may generate complex symbols by encoding and modulating a transmitted bit string, perform mapping of the complex symbols on subcarriers, and then configure OFDM symbols through the inverse fast Fourier transform (IFFT) operation and cyclic prefix (CP) insertion. Further, during data reception, the baseband processor 2i-20 may divide the baseband signal provided from the RF processor 2i-10 in the unit of OFDM symbols, restore the signals mapped on the subcarriers through the fast Fourier transform (FFT) operation, and then restore the received bit string through demodulation and decoding.

The baseband processor 2i-20 and the RF processor 2i-10 may transmit and receive the signals as described above. Accordingly, the baseband processor 2i-20 and the RF processor 2i-10 may be called a transmitter, a receiver, a transceiver, or a communication unit. Further, in order to support different radio connection technologies, at least one of the baseband processor 2i-20 and the RF processor 2i-10 may include a plurality of communication modules. Further, in order to process signals of different frequency bands, at least one of the baseband processor 2i-20 and the RF processor 2i-10 may include different communication modules. Further, the different frequency bands may include super high frequency (SHF) (e.g., 2.5 GHz or 5 GHz) band and millimeter wave (mmWave) (e.g., 60 GHz) band.

The storage unit 2i-30 may store therein a basic program for an operation of the terminal, application programs, and data of setup information.

The controller 2i-40 may control the whole operation of the terminal. For example, the controller 2i-40 may transmit and receive signals through the baseband processor 2i-20 and the RF processor 2i-10. Further, the controller 2i-40 may record or read data in or from the storage unit 2i-30. For this, the controller 2i-40 may include at least one processor. For example, the controller 2i-40 may include a communication processor (CP) performing a control for communication and an application processor (AP) controlling an upper layer, such as an application program. In an embodiment of the present disclosure, the controller 2i-40 may include a multi-connection processor 2i-42 for performing a process to be operated in a multi-connection mode. For example, the controller 2i-40 may control the terminal to perform a procedure illustrated in FIG. 2E illustrating the operation of the terminal.

The controller 2i-40 may detect a triggering of a buffer state report (BSR), identify a logical channel corresponding to the triggered BSR, and control the transceiver to transmit a scheduling request (SR) mapped to the logical channel based on SR configuration information in association with the identified logical channel.

Further, the SR configuration information may further include information on a maximum number of times of transmission.

The controller 2i-40 may identify the maximum number of times of transmission of the SR based on the information on the maximum number of times of transmission, control the transceiver to transmit the SR up to the maximum number of times of transmission of the SR if an uplink resource for the logical channel is unable to be allocated, and control to perform a random access if the uplink resource for the logical channel is unable to be allocated from a base station within a predetermine time after transmitting the SR up to the maximum number of times of transmission.

The controller 2i-40 may determine logical channels having a higher priority among a plurality of logical channels if uplink data to be transmitted from the plurality of logical channels exists at a time when a BSR retransmission timer configured from a base station expires, identify the SR mapped to the logical channels determined to have the high priority, and control the transceiver to transmit the identified SR to the base station.

The controller 2i-40 may control the transceiver to transmit the SR based on priority information configured with respect to the identified logical channels if at least two SR transmissions overlap each other on a resource configured with respect to the logical channels.

The triggered BSR may include a regular BSR triggered in case where the BSR retransmission timer expires.

The controller 2i-40 may control the transceiver to transmit the SR on a resource configured with respect to the identified logical channel.

In an embodiment of the present disclosure, the terminal may receive DRB configuration and SR transmission related configuration from the base station, request scheduling through transmission of the SR according to the above-described embodiment, and transmit data through allocation of uplink resources from the base station.

On the other hand, FIG. 2J is a block diagram illustrating constituent elements of the base station. The base station may include a transceiver 2j-10 and a controller 2j-20.

The transceiver 2j-10 is a constituent element for transmitting and receiving signals.

The controller 2j-20 may control the transceiver 2j-10 to transmit to a terminal a message including configuration information for transmission of a scheduling request (SR) of the terminal and to receive the SR from the terminal based on the configuration information.

If a triggering of a buffer state report (BSR) is detected in the terminal, the SR may be an SR mapped to a logical channel corresponding to the triggered BSR.

The configuration information may further include information on a maximum number of times of transmission.

The SR may be received up to the maximum number of times of transmission of the SR based on the information on the maximum number of times of transmission through the terminal, and a random access may be performed if an uplink resource for the logical channel mapped to the SR is not allocated within a predetermined time.

The message may further include a BSR retransmission timer.

If uplink data to be transmitted from the plurality of logical channels exists at a time when the BSR retransmission timer through the terminal, logical channels having a higher priority among a plurality of logical channels may be determined, and the SR mapped to the determined channels having the high priority may be received.

If at least two SR transmissions overlap each other on a resource configured with respect to the logical channels, through the terminal, the SR may be received based on priority information configured with respect to the identified logical channels.

The triggered BSR may include a regular BSR triggered in case where a BSR retransmission timer expires.

The SR may be received on the resource configured with respect to the identified logical channels.

The methods according to the embodiments described in claims and specification of the present disclosure may be implemented in the form of hardware, software, or a combination of the hardware and software.

In case of software implementation, a computer-readable storage medium for storing one or more programs (software modules) may be provided. One or more programs stored in the computer-readable storage medium are configured for execution by one or more processors in an electronic device. The one or more programs include instructions for the electronic device to execute the methods according to the embodiments described in claims and specification of the present disclosure.

Such programs (software module or software) may be stored in a nonvolatile memory including a random access memory and a flash memory, read only memory (ROM), electrically erasable programmable read only memory (EEPROM), magnetic disc storage device, compact disc-ROM (CD-ROM), digital versatile discs (DVDs), optical storage device of a different type, and magnetic cassette. Further, the programs may be stored in a memory composed of a combination of parts or the whole of them. Further, a plurality of constituent memories may be included.

Further, the programs may be stored in an attachable storage device that can be accessed through a communication network, such as Internet, Intranet, local area network (LAN), wide LAN (WLAN), or storage area network (SAN), or a communication network composed of a combination thereof. Such a storage device may be connected to a device performing the embodiments of the present disclosure through external ports. Further, a separate storage device on the communication network may be connected to the device performing the embodiments of the present disclosure.

In the embodiments of the present disclosure as described above, constituent elements included in the present disclosure are expressed in a singular form or in a plural form. However, such a singular or plural expression is selected to suit a situation presented for convenience in explanation, and thus the present disclosure is not limited to such singular or plural constituent elements. Even plural constituent elements may be expressed in a singular form, and even a single constituent element may be expressed in a plural form.

Although detailed embodiments of the present disclosure have been described in the specification and drawings, it will be apparent that various modifications are possible within the scope of the present disclosure. Accordingly, the scope of the present disclosure should not be limited to the embodiments as described above, but should be defined by the appended claims below and those equivalent to the scope of the claims.

Although the present disclosure has been described with various embodiments, various changes and modifications may be suggested to one skilled in the art. It is intended that the present disclosure encompass such changes and modifications as fall within the scope of the appended claims.

What is claimed is:

1. A method performed by a terminal in a wireless communication system, the method comprising:
   identifying a triggering event of a buffer status report (BSR) based on an expiry of a BSR retransmission timer;
   identifying a highest priority logical channel (LCH) having data available for transmission based on the identified triggering event;
   identifying scheduling request (SR) configuration information corresponding to the highest priority LCH, the SR configuration information including a maximum number of SR transmission values;
   transmitting, to a base station in the wireless communication system, at least one SR based on the identified SR configuration information;
   identifying whether a number of transmissions of the at least one SR reaches a predetermined value that is determined based on the maximum number of the SR transmission values in case that there is no uplink resource available associated with the BSR; and
   initiating a random access procedure in case that the number of transmission of the at least one SR reaches the predetermined value.

2. The method of claim 1, the method further comprising:
   transmitting an SR based on priority information configured corresponding to an LCH, in case that at least two SR transmissions overlap each other on a resource.

3. The method of claim 1, wherein the BSR includes a regular BSR.

4. A terminal for transmitting a scheduling request (SR) in a wireless communication system, the terminal comprising:
   a transceiver; and
   a controller coupled with the transceiver and configured to:
      identify a triggering event of a buffer status report (BSR) based on an expiry of a BSR retransmission timer;
      identify a highest priority logical channel (LCH) having data available for transmission based on the identified triggering event;
      identify scheduling request (SR) configuration information corresponding to the highest priority LCH, the SR configuration information including a maximum number of SR transmission values,
      control the transceiver to transmit, to a base station in the wireless communication system, at least one SR based on the identified SR configuration information;
      identify whether a number of transmission of the at least one SR reaches a predetermined value that is determined based on the maximum number of the SR transmission values in case that there is no uplink resource available associated with the BSR; and
      initiate a random access procedure in case that the number of transmission of the at least one SR reaches the predetermined value.

5. The terminal of claim 4, wherein the controller is further configured to:
   control the transceiver to transmit an SR based on priority information configured corresponding to an LCH, in case that at least two SR transmissions overlap each other on a resource.

6. The terminal of claim 4, wherein the BSR includes a regular BSR.

7. A method performed by a base station in a wireless communication system, the method comprising:
   transmitting, to a terminal in the wireless communication system, a message including scheduling request (SR) configuration information, the SR configuration information including a maximum number of SR transmission values; and
   receiving at least one SR based on the SR configuration information up to a predetermined value that is determined based on the maximum number of the SR transmission values in case that there is no uplink resource available associated with a buffer status report (BSR), wherein, a random access procedure is initiated in case that the at least one SR is received up to the predetermined value, and wherein, a triggering event of the BSR is identified based on an expiry of a BSR retransmission timer, a highest priority logical channel (LCH) having data available for transmission based on the identified triggering event is identified, and the SR configuration information corresponds to the highest priority LCH.

8. The method of claim 7, the method further comprises:

receiving, an SR based on priority information configured corresponding an LCH, in case that at least two SR transmission overlap each other on a resource.

9. The method of claim 7, wherein the BSR includes a regular BSR.

10. A base station for receiving a scheduling request (SR) in a wireless communication system, the base station comprising:

a transceiver; and a controller coupled with the transceiver and configured to control the transceiver to:

transmit, to a terminal in the wireless communication system, a message including scheduling request (SR) configuration information, the SR configuration information including a maximum number of SR transmission values, and receive at least one SR based on the SR configuration information up to a predetermined value that is determined based on the maximum number of the SR transmission values in case that there is no uplink resource available associated with a buffer status report (BSR), wherein, a random access procedure is initiated in case that the at least one SR is received up to the predetermined value, and wherein, a triggering event of the BSR is identified based on an expiry of a BSR retransmission timer, a highest logical channel (LCH) having data available for transmission based on the identified triggering event is identified, and the SR configuration information corresponds to the highest priority LCH.

11. The base station of claim 10, wherein, an SR is received based on priority information configured corresponding to an LCH, in case that at least two SR transmissions overlap each other on a resource.

12. The base station of claim 10, wherein the BSR includes a regular BSR.

* * * * *